United States Patent [19]
Sunohara et al.

[11] Patent Number: 5,587,819
[45] Date of Patent: Dec. 24, 1996

[54] DISPLAY DEVICE

[75] Inventors: Kazuyuki Sunohara; Rei Hasegawa; Hiroyuki Nagata; Shinichi Sanada; Yasushi Kawata, all of Yokohama, Japan

[73] Assignee: Kabushiki Kaisha Toshiba, Kawasaki, Japan

[21] Appl. No.: 364,750

[22] Filed: Dec. 27, 1994

[30] Foreign Application Priority Data

Dec. 27, 1993 [JP] Japan ..................... 5-348499
Jun. 20, 1994 [JP] Japan ..................... 6-137390

[51] Int. Cl.⁶ ..................... G02F 1/1335; G02F 1/1333
[52] U.S. Cl. ..................... 349/106; 349/86
[58] Field of Search ..................... 359/68, 51, 52

[56] References Cited

U.S. PATENT DOCUMENTS

| | | | |
|---|---|---|---|
| 4,793,691 | 12/1988 | Enomoto et al. | 359/68 |
| 5,317,431 | 5/1994 | Yoshida et al. | 359/68 |
| 5,442,467 | 8/1995 | Silverstein et al. | 359/68 |
| 5,469,278 | 11/1995 | Takahara et al. | 359/68 |
| 5,508,831 | 4/1996 | Nakamura et al. | 359/68 |

FOREIGN PATENT DOCUMENTS

| | | | |
|---|---|---|---|
| 61-138233 | 6/1986 | Japan | 359/68 |
| 62-67516 | 3/1987 | Japan | 359/68 |
| 3-84520 | 4/1991 | Japan . | |
| 3-81725 | 4/1991 | Japan | 359/68 |
| 4-156427 | 5/1992 | Japan . | |
| 5-53113 | 3/1993 | Japan | 359/68 |

*Primary Examiner*—William L. Sikes
*Assistant Examiner*—Tiep H. Nguyen
*Attorney, Agent, or Firm*—Oblon, Spivak, McClelland, Maier & Neustadt, P.C.

[57] ABSTRACT

A reflective direct-view type display device including a first substrate having two major surfaces and electrode provided on a first major surface, a second substrate having two major surfaces and color filter layers and pixel electrodes provided on a first major surface, a light-scattering medium interposed between the first and second substrates positioned with the electrode opposes the pixel electrodes, and at least one color filter layer provided on the first major surface of the first substrate and apposing at least one of the color filter layers provided on the first major surface of the second substrate. The display can produce high-luminance colors, by using external light at high efficiency and with a low consumption of electric power.

19 Claims, 20 Drawing Sheets

| PIXCEL | SCATTERING STATE | NON-SCATTERING STATE |
|---|---|---|
| FIRST | WHITE | MAGENTA |
| SECOND | WHITE | CYAN |
| THIRD | YELLOW | BLACK |
| FOURTH | WHITE | BLACK |

| FIRST PIXCEL | SECOND PIXCEL |
|---|---|
| THIRD PIXCEL | FOURTH PIXCEL |

| FIRST PIXCEL | THIRD PIXCEL |
|---|---|
| FOURTH PIXCEL | SECOND PIXCEL |

| FIRST PIXCEL | SECOND PIXCEL | THIRD PIXCEL | FOURTH PIXCEL |
|---|---|---|---|

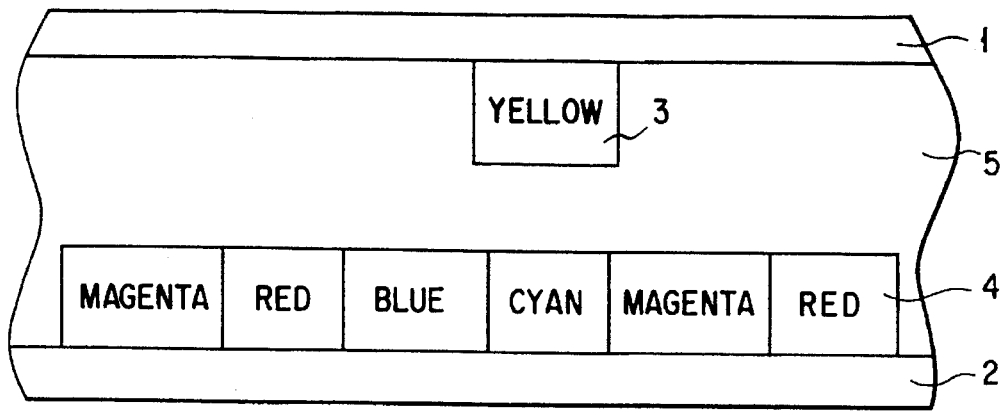
FIG. 10
| PIXCEL | SCATTERING STATE | NON-SCATTERING STATE |
|---|---|---|
| FIRST | WHITE | MAGENTA |
| SECOND | WHITE | RED |
| THIRD | YELLOW | CYAN |
| FOURTH | WHITE | BLUE |
| FIRST PIXCEL | SECOND PIXCEL |
|---|---|
| THIRD PIXCEL | FOURTH PIXCEL |
FIG. 11
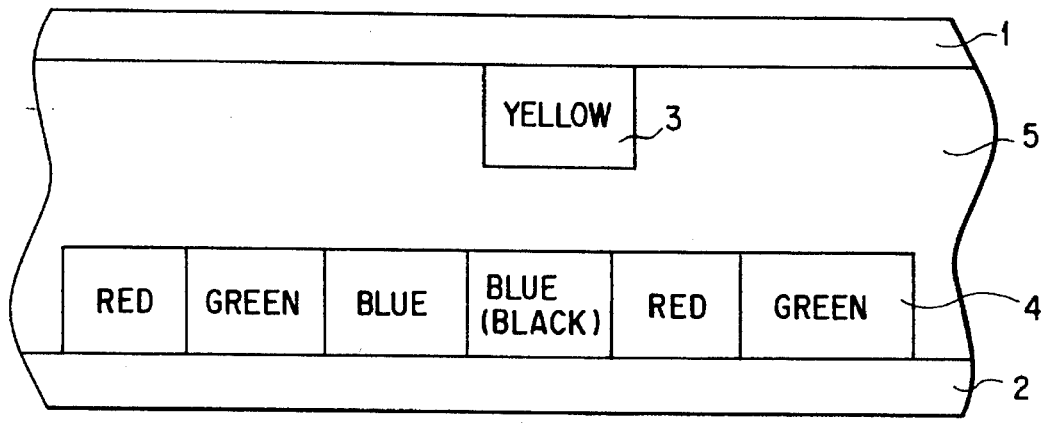
FIG. 12

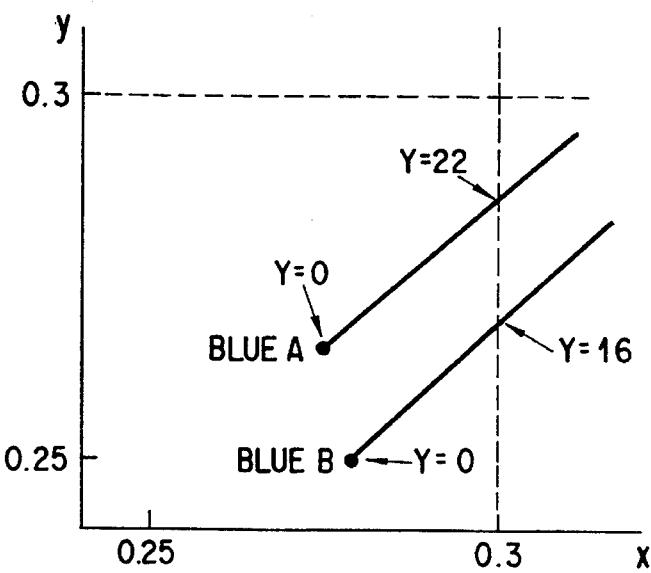
F I G. 16
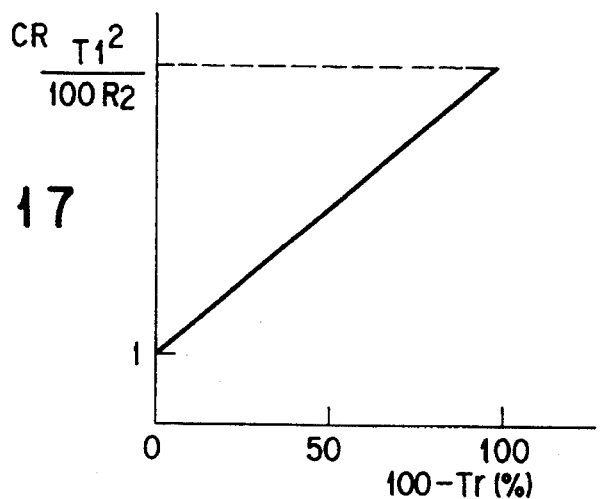
F I G. 17
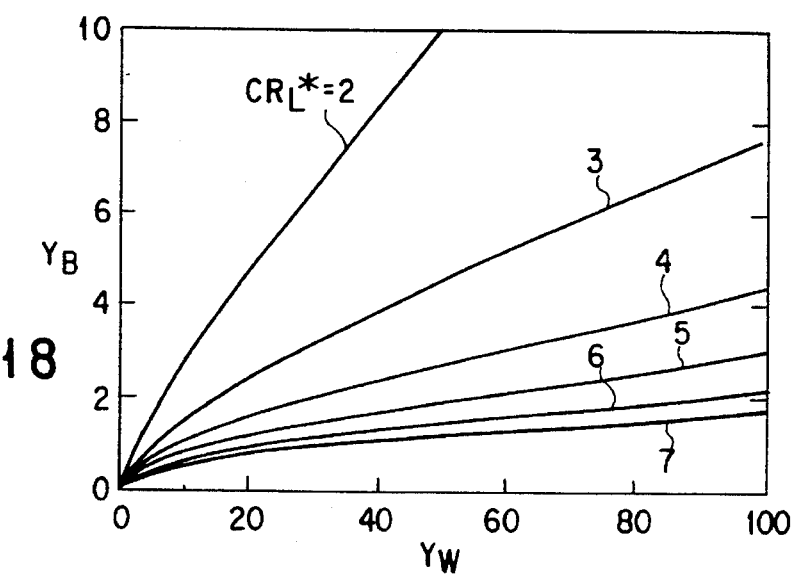
F I G. 18

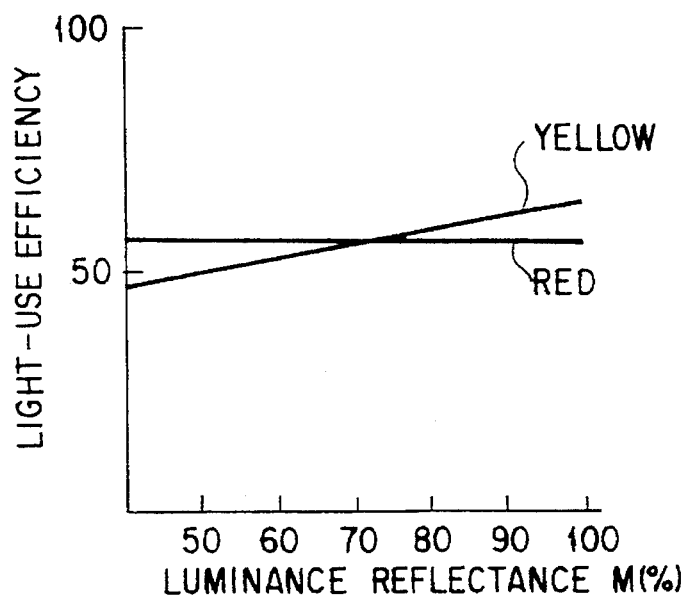
F I G. 19
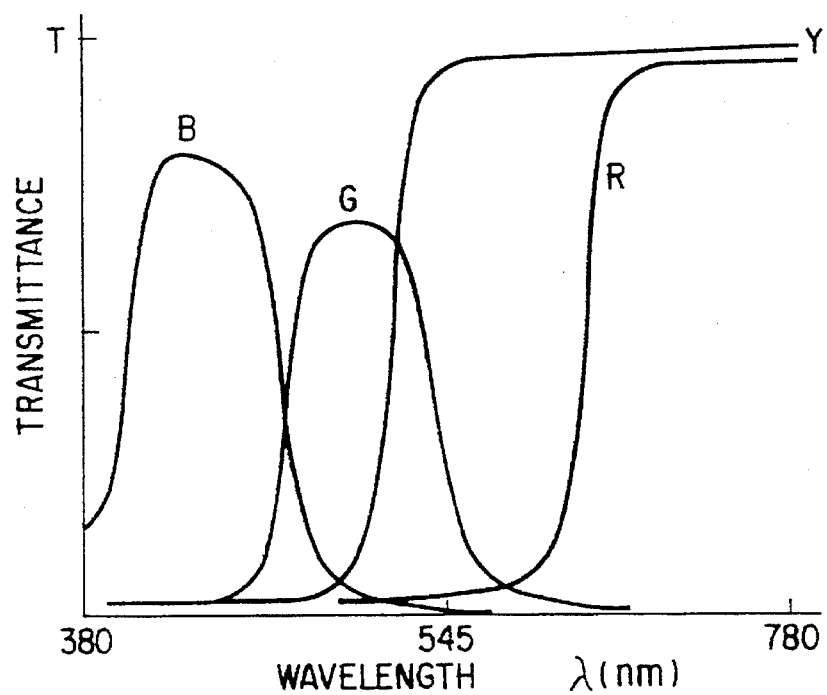
F I G. 20

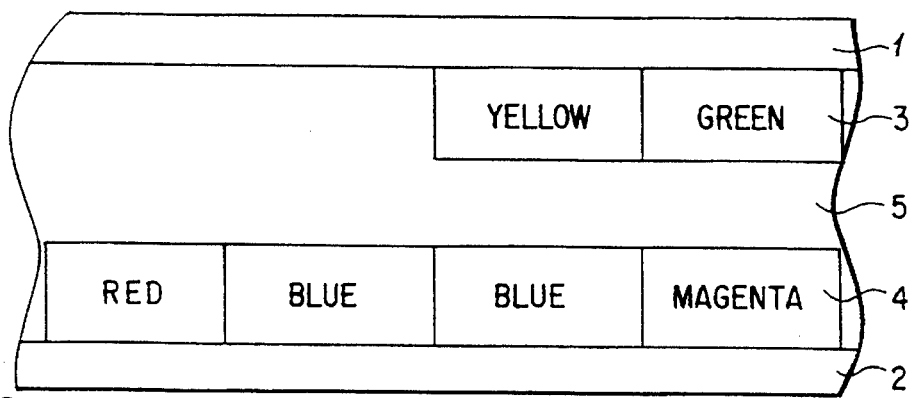
FIG. 21
FIG. 22
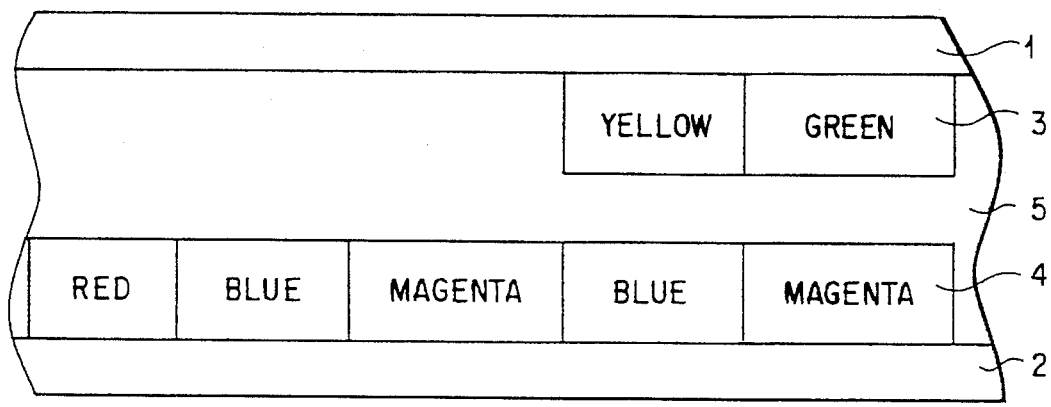
FIG. 23

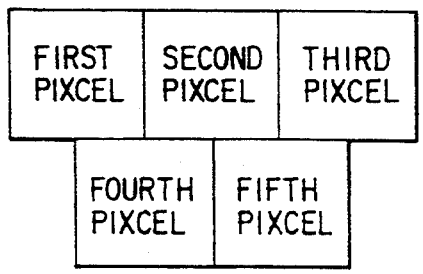
| PIXCEL | SCATTERING STATE | NON-SCATTERING STATE |
|---|---|---|
| FIRST | WHITE | RED |
| SECOND | WHITE | BLUE |
| THIRD | WHITE | MAGENTA |
| FOURTH | YELLOW | BLUE |
| FIFTH | GREEN | MAGENTA |
F I G. 24
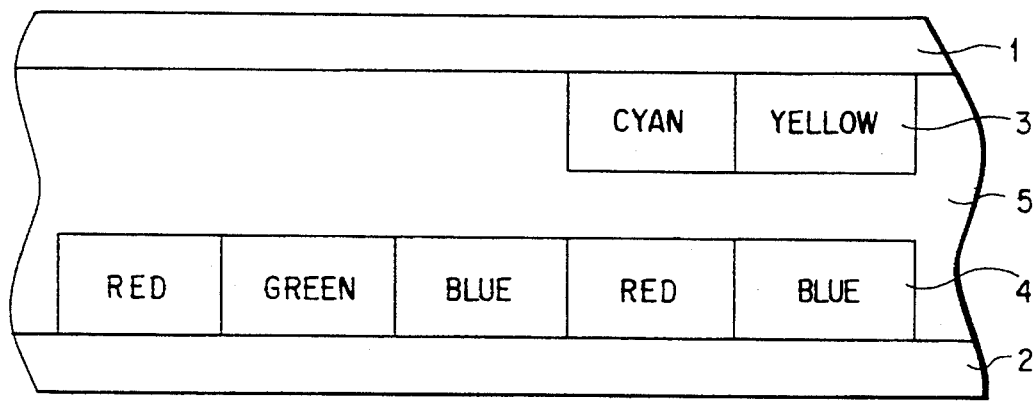
F I G. 25
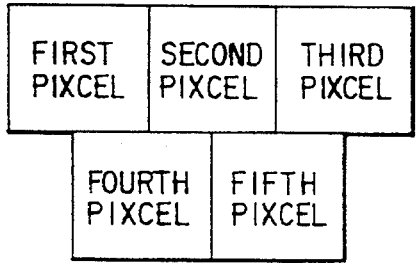
| PIXCEL | SCATTERING STATE | NON-SCATTERING STATE |
|---|---|---|
| FIRST | WHITE | RED |
| SECOND | WHITE | GREEN |
| THIRD | WHITE | BLUE |
| FOURTH | CYAN | RED |
| FIFTH | YELLOW | BLUE |
F I G. 26

| PIXCEL | SCATTERING STATE | NON-SCATTERING STATE |
|---|---|---|
| FIRST | WHITE | RED |
| SECOND | WHITE | GREEN |
| THIRD | WHITE | BLUE |
| FOURTH | CYAN | RED |
| FIFTH | MAGENTA | GREEN |
| SIXTH | YELLOW | BLUE |

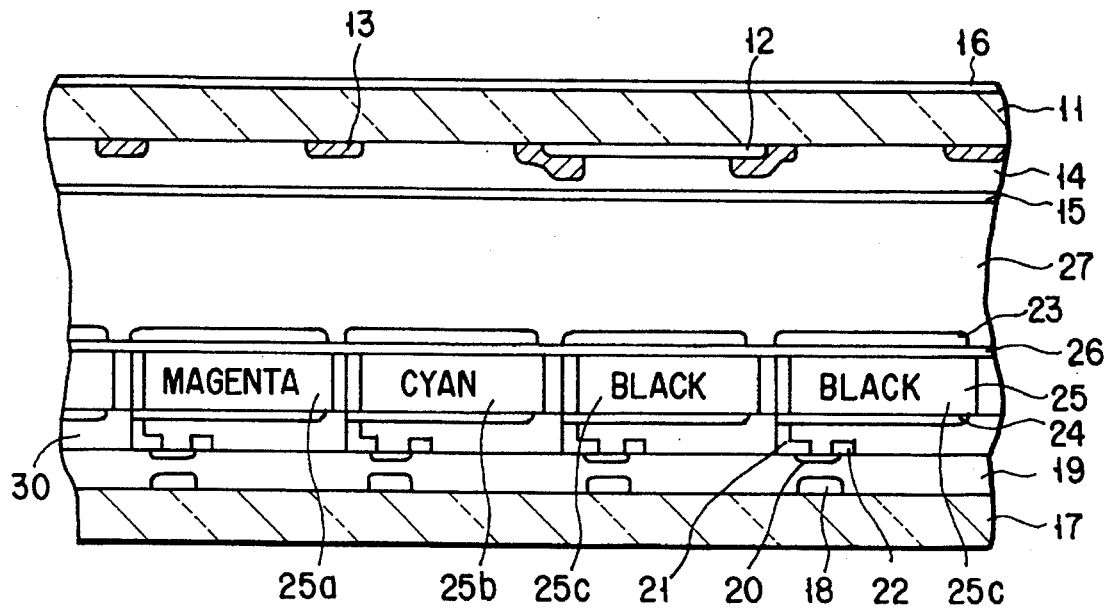
F I G. 29
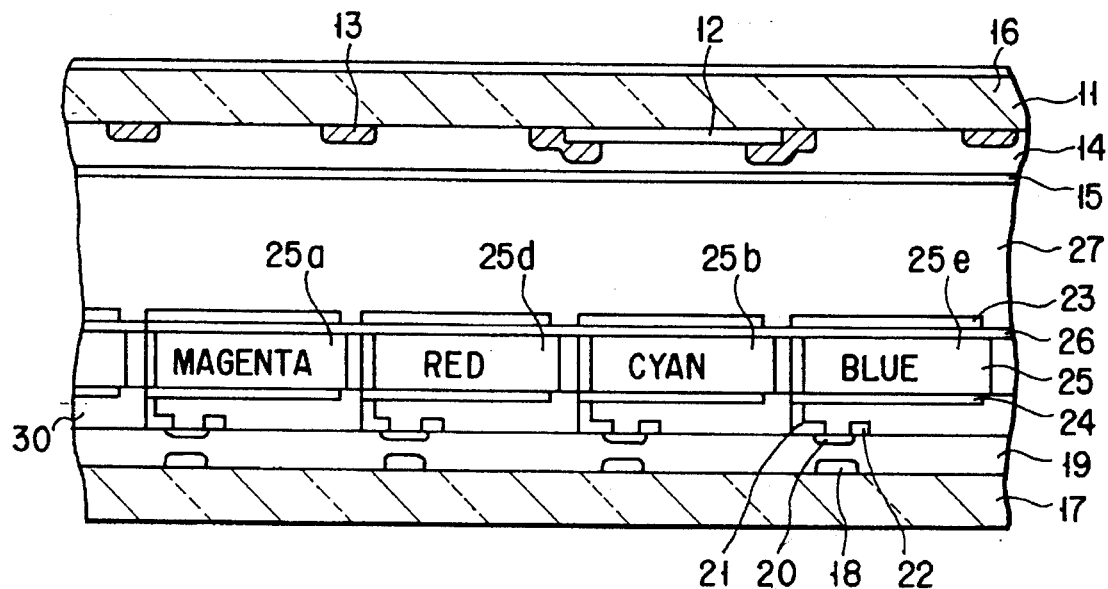
F I G. 30

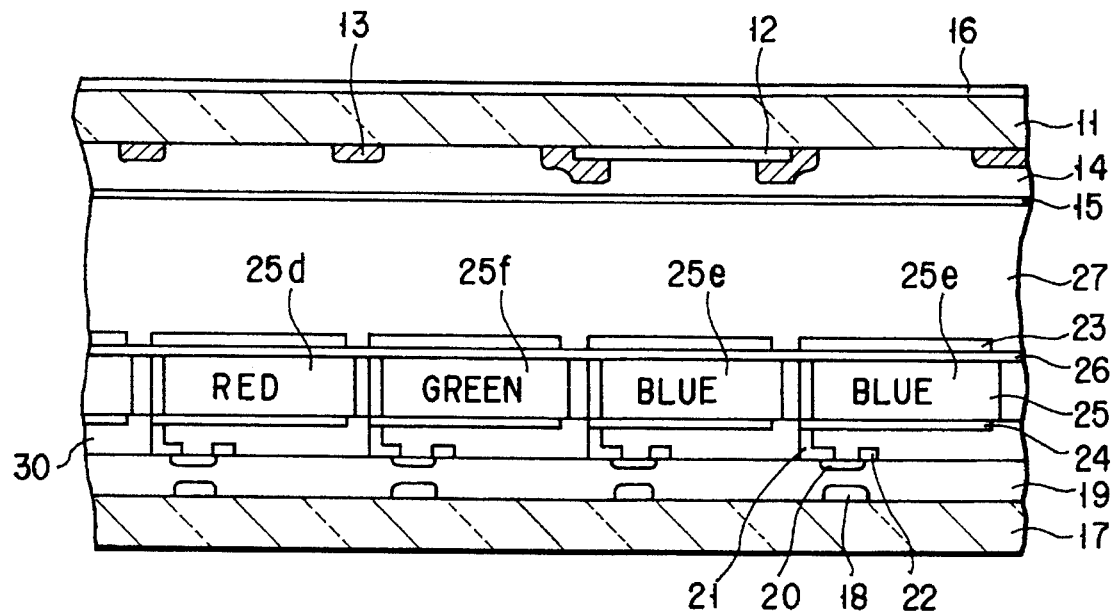
F I G. 31
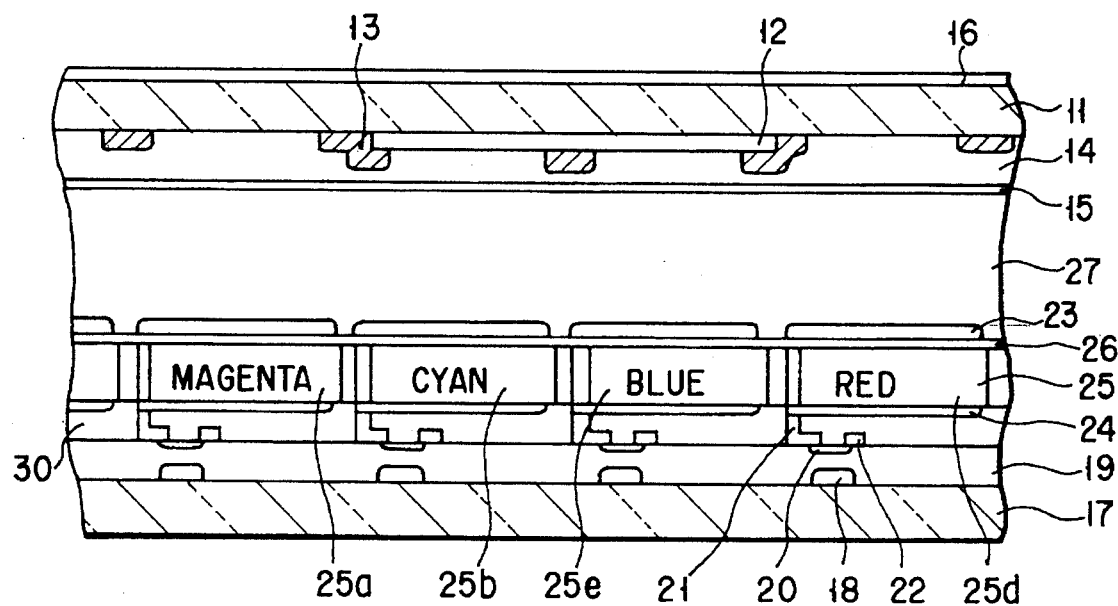
F I G. 32

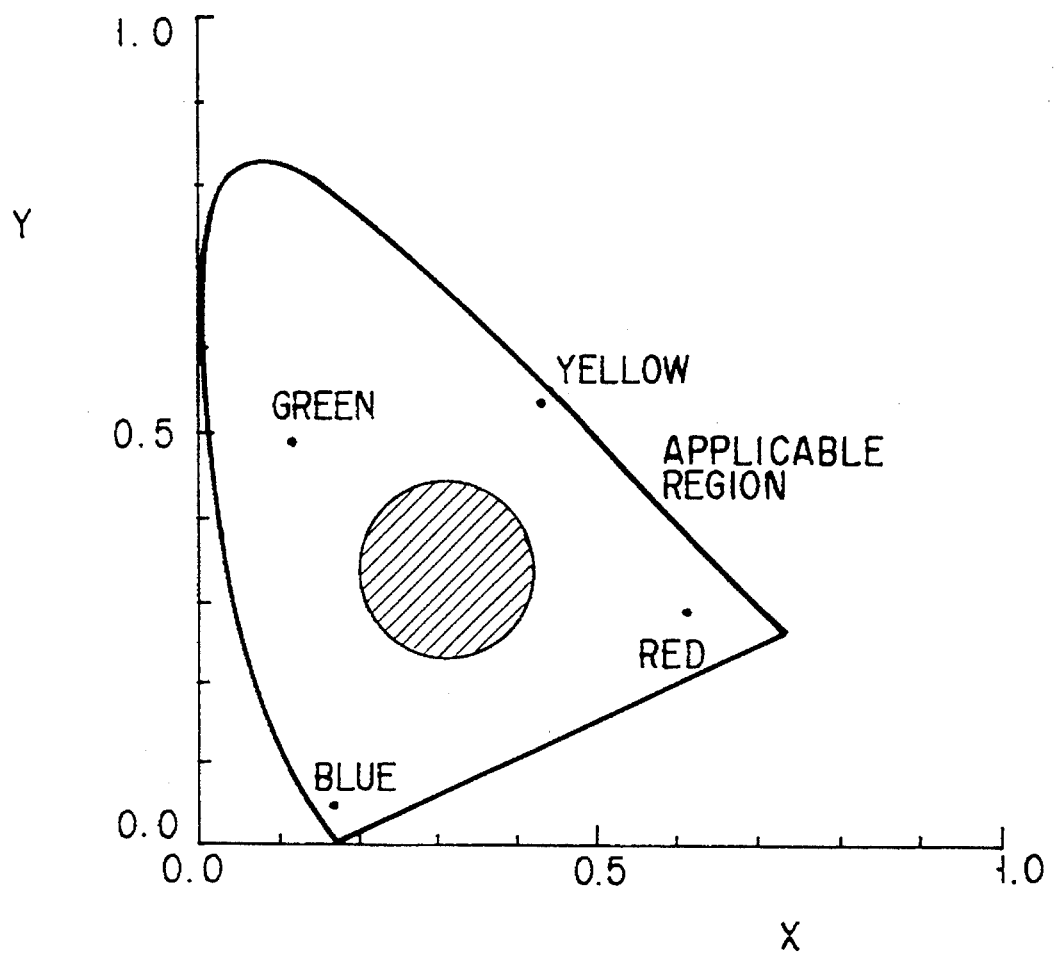
F I G. 37
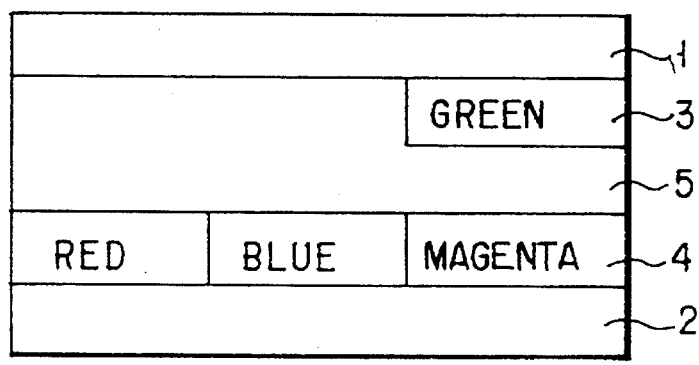
F I G. 38

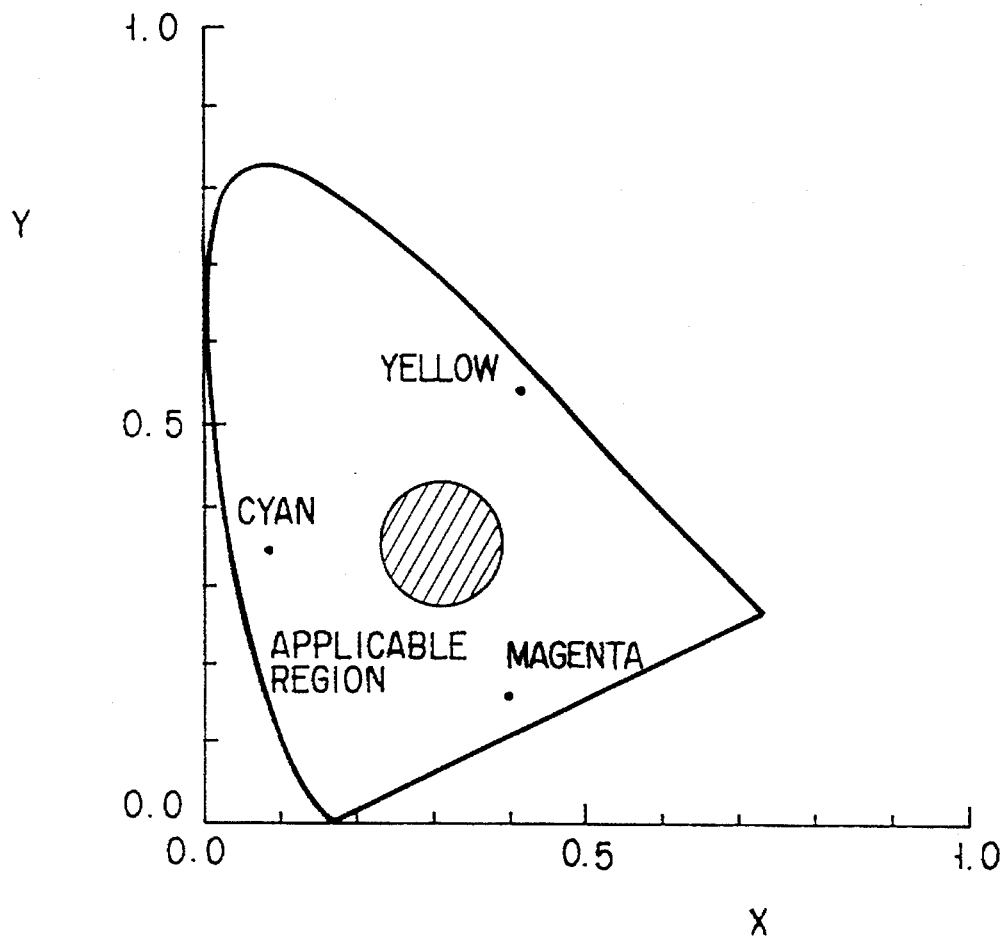
F I G. 41
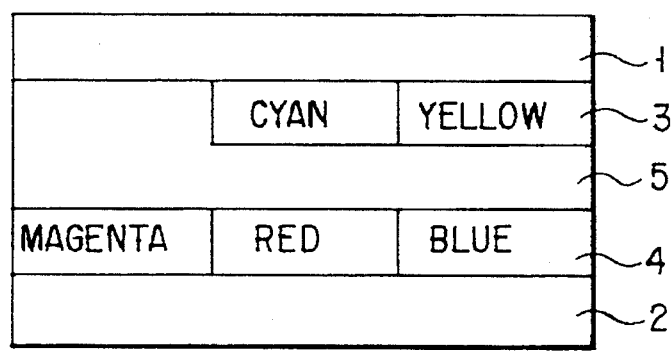
F I G. 42

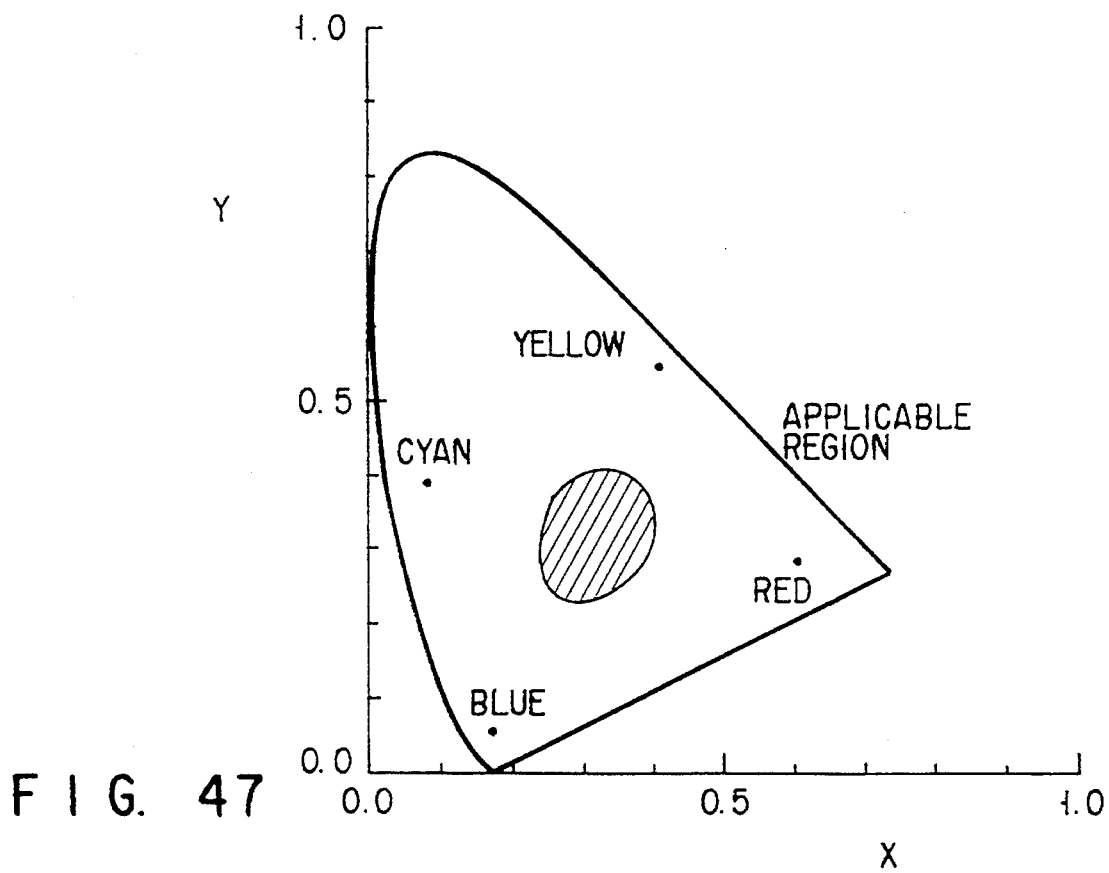
F I G. 47
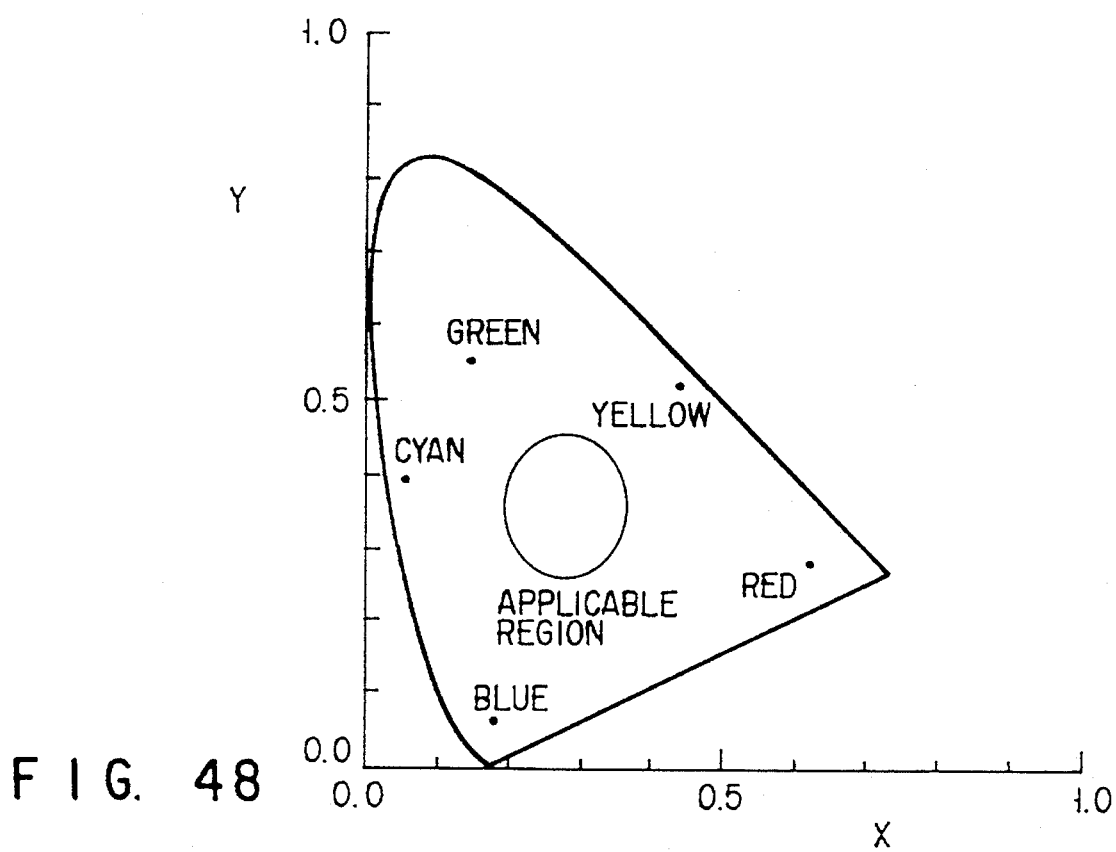
F I G. 48

DISPLAY DEVICE

BACKGROUND OF THE INVENTION

1. Field of the Invention

The present invention relates to a display device.

2. Description of the Related Art

CRTs are widely used as display devices. A CRT has a great depth because it has a single electron gun assembly which applies an electron beam to all pixels provided. Further, it is heavy and consumes much electric power. It is therefore not suitable for a portable display device. Other kinds of display devices, such as plasma displays, EL displays and the like, are available but can hardly be used as portable display devices for various reasons.

Only one portable display device put to practical use is a liquid crystal display. Thin and driven at a low voltage, the liquid crystal display is used in large numbers in wrist watches, pocket calculators and the like. In particular, TN-type liquid crystal displays have become incorporated in TV sets since they incorporate active switching elements (e.g., TFTs) and can exhibit display characteristics comparable with those of CRTs. However, TN-type liquid crystal displays uses light at low efficiency since they have a polarizing plates. They need to have a back light for supplementing light and inevitably consume much electric power.

A liquid crystal display which has no polarizing plate are known. It is known as "polymer-dispersed type displays," which utilize scattered light. The polymer-dispersed type display cannot display multi-color images, as does a reflective direct-view type display. Each RGB pixel used in this display can utilize but only those components of transmitting light which fall within only a third of wavelength region, in order to display a color dot as in a light-transmitting type display. Comprised of three light-transmitting regions (red, green and blue regions), each RGB pixel can use only a ninth of the light passing through it for displaying a color dot. The amount of light used in, for example, a red region is so small that the light emitted from the red region, is a very dark red, appearing almost black.

Furthermore, if a magenta filter, a cyan filter and a yellow filter are provided, respectively covering the three color regions of each RGB pixel, the polymer-dispersed type display can display neither high-luminance color images nor high-contrast monochrome images. This problem, which is inherent in any light-scattering, direct-view display (including a polymer dispersed type display), has yet to be solved. In other words, none of the light-scattering, direct-view type display hitherto known can be practically used as color display.

SUMMARY OF THE INVENTION

In view of the foregoing, the object of the present invention is to provide a reflective direct-view type display, which uses light at high efficiently and which can display high-luminance color images.

According to the invention, there is provided a reflective direct-view type display which comprises: a first substrate having two major surfaces and electrode provided on a first major surface; a second substrate having two major surfaces and color filter layers and pixel electrodes provided on a first major surface; and a light-scattering medium interposed between the first and second substrates positioned with the electrode opposes the pixel electrodes. The display further comprises at least one color filter layer provided on the first major surface of the first substrate and opposes at least one of the color filter layers provided on the first major surface of the second substrate.

A display according to a first aspect of the invention has the structure described above. This display is characterized in two respects. First, the color filter layer provided on the first substrate is a yellow filter layer, and the color filter layers provided on the second substrate are magenta, cyan and black filter layers. Second, the yellow filter layer opposes one of the black filter layers, and that part of the light-scattering medium which opposes at least one part of the black filter layer contains a yellow dye.

A display according to a second aspect of the invention also has the structure described above. It is characterized in two respects. First, the color filter layer provided on the first substrate is a yellow filter layer, and the color filter layers provided on the second substrate are magenta, red, blue and cyan filter layers. Second, the yellow filter layer opposes the cyan filter layer, and that part of the light-scattering medium which opposes at least one part of the cyan filter layer contains a yellow dye.

A display according to a third aspect of the invention has the structure described above. The display is characterized in two respects. First, the color filter layer provided on the first substrate is a yellow filter layer, and the color filter layers provided on the second substrate are red, green and blue filter layers. Second, the yellow filter layer opposes one of the blue filter layers, and that part of the light-scattering medium which opposes at least one of the blue filter layers contains a yellow dye.

A display according to a fourth aspect of this invention has the structure described above. This display is characterized in two respects. First, the color filter layer provided on the first substrate is a yellow filter layer, and the color filter layers provided on the second substrate are magenta, red, blue and cyan filter layers. Second, the yellow filter layer opposes the cyan and blue filter layers, and those parts of the light-scattering medium which oppose with the cyan and blue filter layers contain a yellow dye.

A display according to a fifth aspect of the present invention has the structure described above. The display is characterized in that the first substrate differs in spectral property from the second substrate and exhibits a luminous reflectance of at most 25% while the light-scattering medium remains in non-scattering state.

A display according to a sixth aspect of this invention has the structure described above and is designed to satisfy the following equation:

$$2 \leq \left\{ (100 - Tr) \times \left( \frac{Tl}{100} \right)^2 + \left( \frac{Tr}{100} \right)^2 \times R2 \right\} / R2 \qquad (I)$$

where T1 is the luminous transmittance (%) of the first substrate, R2 is the luminous reflectance (%) of the second substrate, as measured at the outer surface of the first substrate, and Tr is the transmittance which the light-scattering medium (single body) exhibits in a 2° view field while it is scattering light.

A display according to a seventh aspect of the invention has the structure described above and is designed to satisfy the following equation:

$$71 \leq M \leq 100 \qquad (II)$$

where M is the product of the luminous transmittance T1' of the color filter layer on the first substrate and the area ratio D of this color filter layer to the non-pixel region of the first substrate.

A display according to the eighth aspect of this invention has the structure described above and is characterized in two respects. First, the color filter layer provided the first substrate is a yellow filter layer. Second, the yellow filter layer exhibits a transmittance of at least 80% to light having a wavelength of 545 nm, or the color filter layers provided on the second substrate include a green filter layer which exhibits the maximum transmittance to light having a wavelength ranging from 500 nm to 535 nm and a transmittance of 10 to 50% to light having a wavelength of 545 nm.

A display according to a ninth aspect of the invention has the structure described above. This display is characterized in that two color filter layers are provided on the first substrate, which are an yellow filter layer and a green filter layer, and the color filter layers provided on the second substrate are red, blue, magenta and blue filter layers.

A display according to a tenth aspect of the present invention has the structure described above. The display is characterized in that the color filter layers provided on the second substrate are red, green, blue and black filter layers, and the color filter layer provided on the first substrate is of a color complementary to that of at least one of the color filter layers provided on the first substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 10 is a diagrammatic view showing a display device according to the second aspect of this invention;

FIG. 11 illustrates how four of the pixels used in the device of FIG. 10 are arranged, and indicates the color each pixel produces when it assumes a particular state;

FIG. 12 is a schematic view showing a display device according to the third, fourth and eighth aspect of the present invention;

FIG. 16 is a graph showing how a yellow-producing pixel influences the operation of a blue-emitting pixel;

FIG. 17 is a graph representing the relationship between scattering power and image contrast;

FIG. 18 is a graph showing the relationship among psychometric lightness L, image contrast and luminous reflectance;

FIG. 19 is a graph indicating the luminous reflectance of yellow light and that of red light;

FIG. 20 is a graph representing the relationship between transmittance and wavelength, which pertains to the eighth aspect;

FIGS. 21 and 23 schematically show a display device according to the fifth to seventh, and ninth aspect of the invention;

FIGS. 22 and 24 show how four of the pixels used in the display device of FIGS. 21 and 23 are arranged, and represents the color each pixel produces when it takes a specific state;

FIGS. 25 and 27 are diagrammatic representation of a display device according to the fifth to seventh, and tenth aspect of this invention;

FIGS. 26 and 28 show how five of the pixels incorporated in the display device of FIGS. 26 and 28 are arranged, and shows the color each of the five pixels produces when it assumes a specific state;

FIG. 29 is a sectional view showing a part of a TFT-LCD panel according to the first aspect of the present invention;

FIG. 30 is a sectional view showing a part of a TFT-LCD panel according to the second aspect of the invention;

FIG. 31 is a sectional view depicting a part of a TFT-LCD panel according to the third aspect of the present invention;

FIG. 32 is a sectional view showing a part of a TFT-LCD panel according to the fourth aspect of this invention;

FIG. 37 is a graph indicating the color-producing region which is applied to the fifth to seventh aspects of the invention;

FIGS. 38, 40, 42 and 46 are sectional views showing, in part, TFT-LCD panels according to the fifth to seventh aspects of the present invention; and FIGS. 39, 41, 43, 44, 45, 47, 48, 49 and 50 are graphs indicating the color-producing regions which are applied to the fifth to seventh aspects of the invention.

DETAILED DESCRIPTION OF THE PREFERRED EMBODIMENTS

Figures 1, 2, 3, 4:
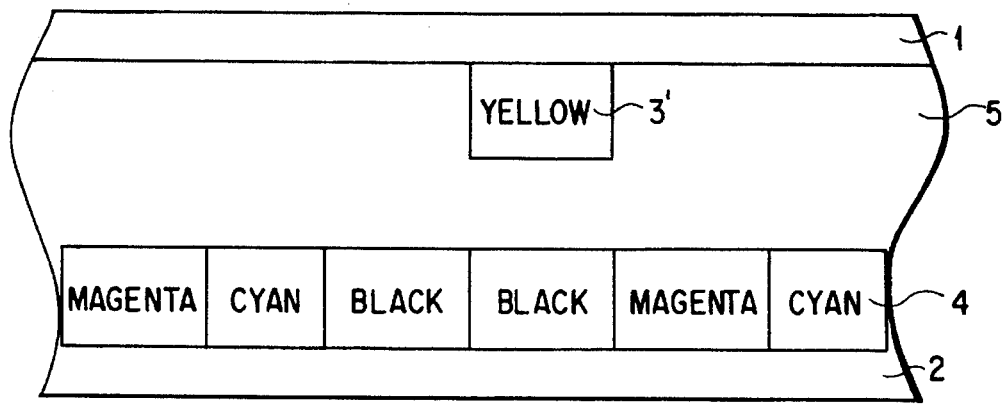
FIG. 1 is a schematic view showing a display device according to the first and, fifth to seventh aspect of this invention.
FIG. 2 shows how four of the pixels used in the device shown in FIG. 1 are arranged, and indicates the color each pixel produces when it assumes a specific state.
FIGS. 3 to 9 shows various arrangements of pixels that may be applied to the display device of FIG. 1.

A display according to the first aspect of the present invention has at least one color display unit comprised of four pixels, a magenta filter, a cyan filter, and two black filters, which are located beneath the first to fourth pixels, respectively, and a yellow filter which is located on the third pixel. How the unit is driven to produce various colors will be explained.

When all pixels are energized, they scatter light, whereby the color display unit produces white. The white produced has a yellow component which is somewhat prominent because of the yellow filter located on the third pixel. Nonetheless, if luminance is high, the yellow component does not impair the whiteness of the white produced. In order to enhance the purity of white, all pixels but the third are energized. As a result, the first, second and fourth pixels produce white, while the third pixel produces black due to the black filter provided beneath it. On the other hand, when the pixels are not energized, they do not scatter light. In this case, the color display unit produces black, and the image contrast obtained is 3:1 or more.

To red, it suffices to energize the second pixel and the third pixel only. The second and third pixels may be energized to different degrees, so that the unit may produce various kinds of reds. To produce blue, it is sufficient to energize the first pixel only. The first, second and third pixels may be energized to different degrees, so that the color display unit may produce various kinds of blues, each subtly different from another. Furthermore, the four pixels may be energized in any other combination, thereby to produce a color other than red and blue.

The display according to the first aspect can produce all colors by means of RGB pixels. It is therefore suitable as one for displaying color images.

A display according to the second aspect of the invention has at least one color display unit comprised of four pixels, a magenta filter, a red filter, a cyan filter and a blue filter which are located beneath the first to fourth pixels, respectively, and a yellow filter which is located on the third pixel. How the color display unit is driven to produce a variety of colors will be described.

If all pixels are energized, they scatter light, whereby the color display unit produces white, as shown in FIG. 11. The white produced has a yellow component which is somewhat prominent because of the yellow filter located on the third pixel. Nonetheless, if luminance is high, the yellow component does not impair the whiteness of the white produced. To increase the purity of white, the third pixel is not energized partially, and light is applied to the cyan filter provided beneath the third pixel, thereby partially absorbing the red component of the yellow. In this case, the purity of white is increased. On the other hand, when the pixels are not energized, they do not scatter light. The color display unit therefore produces purple because of the colors of the filters arranged beneath the pixels. The purple produced is almost black since the luminance is low. In this case, the image contrast obtained is 3:1 or more.

To produce red, it suffices to energize the third pixel and the fourth pixel only. To produce green, the first, second and third pixels are energized to scatter light. The fourth pixel may be energized to a different degree, so that a blue component may be added to the green thus produced. Further, the four pixels may be energized in any other combination, thereby to produce a color other than red and green.

The display according to the second aspect can produce all colors by means of RGB pixels. Particularly, it can produce high-luminance red. The display is therefore suitable as one for displaying text data, some parts of which need to be visually emphasized.

A display according to the third aspect of this invention has at least one color display unit made up of four pixels, a red filter, a green filter, a blue (black) filter and a blue filter which are located below the first to fourth pixels, respectively, and a yellow filter which is located on the third pixel. How this color display unit is driven to produce various colors will be described.

Figures 13, 14, 15:
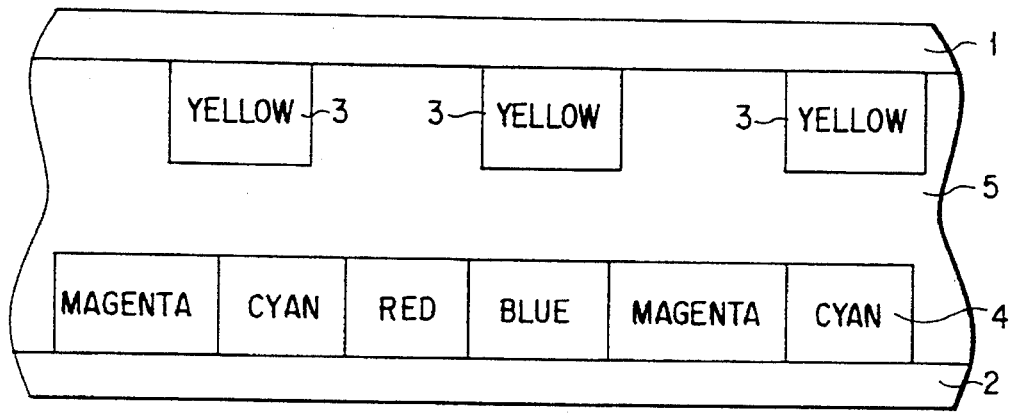
FIG. 13 shows how four of the pixels used in the device shown in FIG. 12 are arranged, and represents the color each pixel produces when it takes a specific state.
FIG. 14 schematically shows a display device according to the fourth aspect of the invention.
FIG. 15 shows how four of the pixels used in the display device of FIG. 14 are arranged, and represents the color each pixel produces when it assumes a specific state.

When all pixels are energized, they scatter light, whereby the color display unit produces white, as shown in FIG. 13. The white produced has a yellow component which is somewhat prominent because of the yellow filter arranged on the third pixel. Nonetheless, if luminance is high, the yellow component does not affect the whiteness of the white produced. To raise the purity of white, the third pixel is not energized, applying light to the blue filter or the black filter provided under the third pixel. The yellow light is thereby absorbed into the blue filter or the black filter, and the third pixel produces black due to the black filter provided beneath it. If none of the pixels are energized to scatter light, the color display unit produces black because of the colors of the filters provided beneath the pixels. In this case, the image contrast obtained is 4:1 or more.

To produce red, the second and fourth pixels are energized to scatter light. The third pixel may be energized to a proper degree, adding a yellow component to the red produced. The red is thereby changed subtly to a different red. To produce blue, the first and second pixels are energized to scatter light. The second pixel may be energized to a different degree, adding a green component to the blue produced. The blue is thereby delicately changed to a different blue. More-over, the four pixels may be energized in any other combination, whereby the color display unit produces a color other than red and blue. The lightness of any color can be adjusted by changing the degree to which each pixel, particularly the third pixel, is energized.

The display according to the third aspect of the invention can produce red, green and blue in good balance by means of RGB pixels. Hence, the display is suitable as one for displaying multimedia data.

A display according to the fourth aspect of the invention has at least one color display unit comprising four pixels, a red filter, a magenta filter, a cyan filter and a blue filter which are provided beneath the first to fourth pixels, respectively, and two yellow filters which are located on the third and fourth pixels, respectively. How this unit is driven to produce various colors will be explained.

To produce white, all pixels are energized, scattering light, as shown in FIG. 15. The unit therefore produces white, which has yellow components which are somewhat prominent because of the yellow filters arranged on the third and fourth pixels. If luminance is high, however, the yellow components do not affect the whiteness of the white. To improve the purity of white, the third pixel is not energized. The third pixel does not scatter light, partially applying light to the cyan filter provided below the third pixel. Red component of yellow is absorbed into the cyan filter partially, thereby increasing the purity of white. The fourth pixel does not scatter light, applying light to the blue filter provided below the fourth pixel. Yellow light is thereby absorbed into the blue filter, and the third pixel produces black due to the blue filter provided beneath it, thereby increasing the purity of white. To produce black, none of the pixels are energized to scatter light. As a result, the color display unit produces purple because of the colors of the filters provided below the pixels. The purple produced is almost black since the luminance is low. In this case, the image contrast obtained is 3:1 or more.

To produce red, only the fourth pixels is energized to scatter light. The third pixel may be energized to an appropriate degree to add a yellow component to the red produced. The red can thereby be changed subtly to a different red. To produce green, the first and second pixels are energized to scatter light, while the first and second pixels are not energized. The third pixel may be energized to a proper degree to add a green component to the green produced. The green can therefore be delicately changed to a different green. Further, the four pixels may be energized in any other combination, whereby the color display unit produces a color other than red and green.

The display according to the ninth aspect produces green which has luminance higher than that of the red it produces. Hence, this display is suitable as one for use in computer terminals.

Two types of displays according to the ninth aspect of the invention will be described.

The first type display according to the ninth aspect has at least one color display unit comprising four pixels, a red filter, two blue filters, and a magenta filter which are provided beneath the first to fourth pixels, respectively, and a yellow filter and a green filter which are located on the third and fourth pixels, respectively. How this unit is driven to produce various colors will be explained.

To produce white, all pixels are energized, scattering light, as shown in FIG. 22. The unit therefore produces white, which has a yellow component and a green component, both somewhat prominent because of the yellow filter and the green filter arranged on the third and fourth pixels. If luminance is high, however, the yellow and green components do not affect the whiteness of the white. Since yellow light and green light totally pass through a high-visibility wavelength region, the display unit has a luminous reflectance comparable with that of a display unit which has no color filters at all. To produce black, none of the pixels are energized to scatter light. As a result, the color display unit produces black due to mix the colors of the filters arranged to the first and second substrate. The black produced is somewhat purple because of the red and blue components are luminous. Nonetheless, the color produced appears sufficiently black since it has low visibility. In this case, the image contrast obtained is 6:1 or more.

To produce red, only the second pixel is energized to scatter light. Other colors can be produced by energizing the pixels in other various combinations.

The second type display according to the ninth aspect has at least one color display unit comprising five pixels, a red filter, a blue filter, a magenta filter, a blue filter and a magenta filter which are provided below the first to fifth pixels, respectively, and a yellow filter and a green filter which are located on the fourth and fifth pixels, respectively. How the color display unit is driven to produce various colors will be explained.

To produce white, all five pixels are energized, scattering light, as shown in FIG. 24. The unit therefore produces white which is quite pure. The display unit has a luminous reflectance comparable with that of a display unit which has no color filters at all. To produce black, none of the pixels are energized to scatter light. As a result, the color display unit produces black due to mix the colors of the filters arranged to the first and second substrate. In this case, the image contrast obtained is 6:1 or more.

To produce red, only the second and third pixels are energized to scatter light, or only the second and fourth pixels are energized to scatter light. To produce green, all pixels, but the fourth, are energized to scatter light. The color display unit can produce colors other than red and green can be produced when the pixels are energized in other various combinations.

Two types of displays according to the tenth aspect of this invention will be described.

The first type display according to the tenth aspect has at least one color display unit comprising five pixels, a red filter, a green filter, a blue filter, a red filter and a blue filter which are provided beneath the first to fifth pixels, respectively, and a cyan filter and a yellow filter which are located on the fourth and fifth pixels, respectively. How this unit is driven to produce various colors will be explained.

To produce white, all pixels are energized, scattering light, as shown in FIG. 26. The unit therefore produces white, which has a cyan component and a yellow component, both somewhat prominent because of the cyan filter and the yellow filter arranged on the fourth and fifth pixels. If luminance is high, however, the cyan and yellow components do not affect the whiteness of the white. Since cyan light and yellow light totally pass through a wavelength region of high visibility, the display unit has a luminous reflectance as high as that of a display unit which has no color filters at all. To produce black, none of the pixels are energized to scatter light. As a result, the color display unit produces black due to mix the colors of the filters arranged to the first and second substrate. The black thus produced appears somewhat purple because of the red and blue components are luminous. Nonetheless, the color produced is sufficiently black since it has a low visibility. In this case, the image contrast obtained is 5:1 or more.

To produce red, only the second and third pixels are energized to scatter light. To produce green, only the first and third pixels are energized to scatter light. Further, the third pixel may be energized to a different degree to add a cyan component to the red or green, thereby changing the red or green subtly. Other colors can be produced by energizing the five pixels in other various combinations.

The second type display according to the tenth aspect has at least one color display unit comprising six pixels, a red filter, a green filter, a blue filter, a red filter, a green filter and a blue filter which are provided below the first to sixth pixels, respectively, and a cyan filter, a magenta filter and a yellow filter which are located on the fourth, fifth and sixth pixels, respectively. How this color display unit is driven to produce various colors will be explained.

Figure 28:
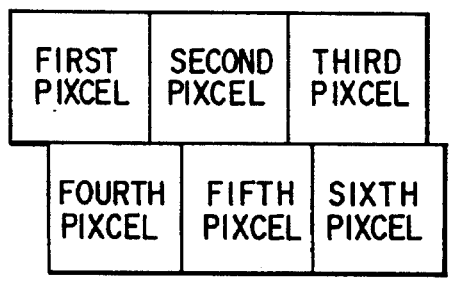

To produce white, all five pixels are energized, scattering light, as shown in FIG. 28. The unit therefore produces white which has high purity. The white produced has a yellow component, a cyan component and a magenta component due to the use of the cyan, yellow and magenta filters. Although the unit has relatively low reflectance to the yellow and cyan components because of the magenta component, the purity of white is increased. To produce black, none of the pixels are energized to scatter light. As a result, the color display unit produces black due to mix the colors of the filters arranged to the first and second substrate. In this case, the image contrast obtained is 6:1 or more.

To produce red, only the second and third pixels are energized to scatter light, or the second, third, fifth and sixth pixels are energized to scatter light. To produce green, only the first and third pixels are energized to scatter light, or the first, third, fourth and sixth pixels are energized to scatter light. The color display unit can produce colors other than red and green can be produced when the pixels are energized in other various combinations.

The displays described above have two substrates, a common electrode and pixel electrodes. The substrates are located one above the other, and parallel to each other. They may be glass substrates, plastic substrates, or the like. The common electrode may be formed of ITO (a mixture of indium oxide and tin oxide), an indium-tin alloy, or a similar material. The pixel electrodes are made of ITO, aluminum or the like.

The pixels used in each display described above are made of a light-scattering medium, which is, for example, a polymer-dispersed type material. The color filters incorporated in each display are made of any material dyed with a dye or a pigment or containing a dye or a pigment. The material of the color filters may be a polymer such as acrylic resin, epoxy resin, gelatin, PVA (Polyvinyl Alcohol) or the like. Alternatively, it may be any material used to manufacture color filters by means of coloring, printing, coloring-polymer method, electro-coating or vapor deposition.

With a light-scattering, direct-view type display, it is desired that the pixels scatter light to produce white in order to use external light efficiently. The white produced by scattering light is good for human eyes.

In the present invention, the first and second substrates and the light-scattering medium interposed between the substrate constitute a light-scattering display panel whose light-scattering power can be adjusted and which help produce desired colors. The display panel may be of the type which can take only two alternative states, i.e., scattering state and non-scattering state. It is desirable that the panel be one which stores light energy. The light-scattering medium may be a polymer with liquid crystal dispersed in it, phase-change medium, DS (Dynamic Scattering) medium, TS (Transient Scattering) medium containing ferroelectric liquid crystal, or an electrothermal optical medium.

A light-scattering display panel, which cannot store light energy, may be utilized. If this is the case, charge-holding elements such as TFTs (Thin-Film Transistors) are incorporated in the display panel for the purpose of displaying color images of higher quality. Preferably, as shown in FIG. 29, the gate line 18 and signal line 22 of each TFT are arranged beneath a color filter 25—that is, near the lower substrate 17. Thanks to this structure, the light-scattering display panel can display color images in high contrast. It is desirable that the portions of the light-scattering medium, other than those serving as pixels, should not be energized so that they may remain normally black. In the light-scattering display panel, the color filter layers should preferably be located as close to the light-scattering medium as possible the light beams passing through the filters may be emitted from the upper substrate 11 without a prominent energy loss. The upper substrate 11 should better be surface-treated to reflect the image of anything present in its vicinity, as little as possible.

It is required that the pixels be as small as possible in order to enhance the image resolution. The display according to the first aspect of the invention has pixels arranged in the density of 600 dpi or more. The displays according to the second to tenth embodiments of the invention have pixels arranged in the density of 300 dpi or more.

The first aspect of the present invention will now be described in detail, with reference to FIGS. 1 to 9. The first aspect is based on the inventors' finding that various colors, each having high purity and high luminance, can be produced by using three types of color filters and one yellow filter.

FIG. 1 shows a light-scattering display panel according the first aspect. As FIG. 1 shows, the panel comprises a first substrate 1, a second substrate 2, a yellow filter 3, magenta, cyan and black filters 4, and a layer of light-scattering medium 5. The filters 4 are mounted on the inner surface of the second substrate 2. The yellow filter 3 is mounted on the inner surface of the first substrate 1 and located right above one of the black filters 4. The light-scattering medium 5 is interposed between the substrates 1 and 2.

The portions of the medium 5, which are located on the color filters 4 work as pixels. Each pixel scatters light when it is energized, and remains in non-scattering state unless it is energized. Adjacent four of the pixels are arranged on the magenta filter, the cyan filter, the first black filter and the second black filter, respectively, as can be understood from FIG. 2.

The ratio in area among the four pixels is not limited to that shown in FIG. 2. Rather, the ratio can be varied to change image contrast or color luminance. The area of the fourth pixel may be increased. The panel can then produce high-contrast images. If the fourth pixel is more than twice as large as the other three pixels, however, the panel can no longer produce colors. Thus, it is desirable that the area ratio among the first to fourth pixels should range from 1:1:1:1 to 1:1:1:2. In other words, the ratio in area among the magenta filter, the cyan filter and two black filters should range from 1:1:2 to 1:1:3.

As shown in FIG. 1, the yellow filter 3 is mounted on the inner surface of the first substrate 1 and located above the third pixel, so that the third pixel produces yellow when energized to scatter light. That is, the third pixel is covered with a yellow filter. Alternatively, the third pixel may contain a yellow dye.

The four pixels or more pixels may be arranged in various patterns other than the pattern shown in FIG. 2. For example, they may be arranged as illustrated in FIGS. 3 to 9.

The second aspect of the present invention will now be described in detail, with reference to FIGS. 10 and 11. The second aspect is based on the inventors' finding that various colors, each having high purity and high luminance, can be produced by using four types of color filters and one yellow filter.

FIG. 10 shows a light-scattering display panel according the second aspect. As FIG. 10 shows, the panel comprises a first substrate 1, a second substrate 2, a yellow filter 3, magenta, cyan, red and blue filters 4, and a layer of light-scattering medium 5. The filters 4 are mounted on the inner surface of the second substrate 2. The yellow filter 3 is mounted on the inner surface of the first substrate 1 and located right above the cyan filter 4. The light-scattering medium 5 is interposed between the substrates 1 and 2.

The four portions of the medium 5, which are located on the color filters 4 work as pixels. Each pixel scatters light when it is energized, and remains in non-scattering state unless it is energized. The first to fourth pixels are arranged on the magenta filter, the red filter, the cyan filter and the blue filter, respectively, as can be seen from in FIG. 11.

The best ratio in area among the first to fourth pixels is 1:1:1:1, so that the panel may produce colors over a broad wavelength range. That is, the ratio in area among the magenta filter, the red filter, the cyan filter and the blue filter should be 1:1:1:1.

As shown in FIG. 10, the yellow filter 3 is mounted on the inner surface of the first substrate 1 and located on the third pixel, so that the third pixel produces yellow when energized to scatter light. Namely, the third pixel is covered with a yellow filter. Instead, the third pixel may incorporate a light-scattering element containing a yellow dye.

The four pixels or more pixels may be arranged in various patterns other than the pattern shown in FIG. 11. For example, they may be arranged as illustrated in FIGS. 3 to 6.

The third aspect of the this invention will now be described in detail, with reference to FIGS. 12 to 15. The third aspect is based on the inventors' finding that various colors, each having high purity and high luminance, can be produced by using three types of color filters and one yellow filter.

FIG. 12 shows a light-scattering display panel according the third aspect. As FIG. 12 illustrates, the panel comprises a first substrate 1, a second substrate 2, a yellow filter 3, red filter, green and blue filters 4, and a layer of light-scattering medium 5. The filters 4 are mounted on the inner surface of the second substrate 2. The yellow filter 3 is mounted on the inner surface of the first substrate 1 and located above the first black filter. The light-scattering medium 5 is interposed between the substrates 1 and 2.

The four portions of the medium 5, which are located on the color filters 4 work as pixels. Each pixel scatters light when it is energized, and remains in non-scattering state unless it is energized. The first to fourth pixels are arranged on the red filter, the green filter, the first blue filter and the second blue filter, respectively, as can be understood from in FIG. 13.

The ratio in area among the first to fourth pixels is not limited to the one shown in FIG. 13. Rather, the ratio can be varied to change image contrast or color luminance. The area of the third pixel may be increased. The panel can then produce high-contrast images. If the third pixel is more than twice as large as the other three pixels, however, the panel can no longer produce colors. In view of this, it is desirable that the area ratio among the first to fourth pixels should range from 1:1:0.5:1 to 1:1:2:1. In other words, the ratio in area among the red filter, the green filter and two blue filters should range from 1:1:1.5 to 1:1:3. Preferably, the ratio in area among the first to fourth pixels is 1:1:1:1, and the ratio in area among the red filter, the green filter and the blue filters is 1:1:2.

As shown in FIG. 12, the yellow filter 3 is mounted on the inner surface of the first substrate 1 and located on the third pixel, so that the third pixel produces yellow when energized to scatter light; only the third pixel has a yellow filter. Alternatively, the third pixel may incorporate a light-scattering element containing a yellow dye.

The four pixels or more pixels may be arranged in various patterns other than the pattern shown in FIG. 13. For example, they may be arranged as illustrated in FIGS. 4, 5, 8 and 9.

The fourth aspect of the present invention will now be described in detail, with reference to FIG. 15. The fourth aspect is based on the inventors' finding that various colors, each having high purity and high luminance, can be produced by using four types of color filters and two yellow filters.

FIG. 14 shows a light-scattering display panel according the fourth aspect. As FIG. 14 shows, the panel comprises a first substrate 1, a second substrate 2, two yellow filters 3, red, magenta, cyan and blue filters 4, and a layer of light-scattering medium 5. The filters 4 are mounted on the inner surface of the second substrate 2. The two yellow filters 3 are mounted on the inner surface of the first substrate 1 and located right above the cyan filter and the blue filter, respectively. The light-scattering medium 5 is interposed between the substrates 1 and 2.

The four portions of the medium 5, which are located on the color filters 4 work as pixels. Each pixel scatters light when it is energized, and remains in non-scattering state unless it is energized. As can be understood from FIG. 15, the first to fourth pixels are arranged on the red filter, the magenta filter, the cyan filter and the blue filter, respectively.

The best ratio in area among the first to fourth pixels is 1:1:1:1, so that the panel may produce colors over a broad wavelength range. To state it another way, the ratio in area among the red filter, the magenta filter, the cyan filter and the blue filter should be 1:1:1:1.

As illustrated in FIG. 14, the two yellow filters 3 are mounted on the inner surface of the first substrate 1 and located on the third and fourth pixels, respectively. Thus, the third pixel and the fourth pixel produce yellow when energized to scatter light. Namely, the third and fourth pixels are covered with yellow filters. Instead, the third pixel and the fourth pixel may incorporate a light-scattering element containing a yellow dye.

The four pixels or more pixels may be arranged in various patterns other than the pattern shown in FIG. 17. For instance, they may be arranged as illustrated in FIGS. 4, 5, 8 and 9.

The fifth aspect of the invention will now be described in detail, with reference to FIGS. 12, 13 and 16. The fifth aspect is based on the inventors' finding that various colors, each having high purity and high luminance, can be produced by using four types of color filters and one yellow filter.

FIG. 12 shows a light-scattering display panel according the fifth aspect. As FIG. 12 shows, the panel comprises a first substrate 1, a second substrate 2, a yellow filter 3, red, green, black and blue filters 4, and a layer of light-scattering medium 5. The filters 4 are mounted on the inner surface of the second substrate 2. The yellow filter 3 is mounted on the inner surface of the first substrate 1 and located above the black filter. The light-scattering medium 5 is interposed between the substrates 1 and 2.

The four portions of the medium 5, which are located on the color filters 4 work as pixels. Each pixel scatters light when it is energized, and remains in non-scattering state unless it is energized. As can be understood from FIG. 13, the first to fourth pixels are arranged on the red filter, the green filter, the black filter and the blue filter, respectively.

Particularly, yellow pixels are used to produce light having a wavelength near 530 to 560 nm and having high luminous reflectance, disabling green pixels to produce light having a wavelength falling within this range. Hence, the luminous reflectance of the green pixels which is lighter than those of the red and blue pixels can be reduced. This makes it possible to display images having high contrast in a broad range of colors. The term "luminous reflectance" means luminance factor Y.

In the light-scattering display panel shown in FIG. 12, the yellow filter 3 provided on the inner surface of the first substrate 1 exhibits a spectrum, whereas the filters 4 provided on the inner surface of the second substrate 2 exhibit another spectrum. Further, each filter differs from any other filter in either hue or luminosity. This is because the yellow component appearing in the front of the panel due to the yellow filter 3 must be minimized or eliminated in order to produce blue, i.e., the color complementary to yellow. The light-scattering medium 5 is one which has no scattering power to yellow. The yellow filter 3 and the black filter 4, which overlap each other, change yellow to another color or black (an achromatic color). As is known in the art, blue is a color of low visibility. Hence, in order not to affect the blue produced by any other pixel, the third pixel covered with the yellow filter 3 needs to produce color which has a visibility equal to lower than that of blue. More specifically, the third pixel must emits a color having a visibility of 25% or less when it is energized and scatters light; otherwise, it would adversely influence the blue produced by any other pixel.

FIG. 16 shows how a yellow-producing pixel influenced the color produced by mixing colors in a color display unit comprised of a blue-emitting pixels A (x, y)=(0.15, 0.12), a blue-emitting pixel B (x, y)=(0.15, 0.05), a white-emitting pixel and the yellow-emitting pixel, the pixels A and B having a luminous reflectance of 15% and a luminous reflectance of 5%, respectively. As can be understood from FIG. 16, the color produced by the color display unit will be recognized as white, not as blue, assuming that white and yellow have a luminous reflectance of 22% and a luminous reflectance of 16%, respectively. It was found that the unit could not produce blue when the color the yellow-emitting pixel produced a color having a luminous reflectance exceeding 25%. The point, (x, y)=(0.3, 0.3), shown in FIG. 16 indicates a blue-white boundary. Any color beyond this point cannot be recognized as blue. It is desirable that black, i.e., achromatic color, be produced by virtue of the color filters overlapping one another.

The sixth aspect of the invention will be described. A light-scattering display panel according the fifth aspect comprises two substrates, a layer of light-scattering medium interposed between the substrates, and a plurality of color filters. In order to perform its function, this display panel needs to satisfy the following requirement:

$$2 \leq \left\{ (100-Tr) \times \left(\frac{Tl}{100}\right)^2 + \left(\frac{Tr}{100}\right)^2 \times R2 \right\} / R2 \quad (I)$$

where Tl is the luminous transmittance (%) of the color filter layer provided on the first substrate, R2 is the luminous reflectance (%) of the color filter layer provided on the second substrate, as measured at the outer surface of the first substrate, and Tr is the transmittance which the light-scattering medium exhibits in a 2° view field while it is scattering light. Tl, R2 and Tr are presented in percentage.

It is desirable that the light-scattering medium have as great scattering power (i.e., 100-Tr in Equation (I)) as possible. This is because the scattering power is proportional to the contrast of resultant color images as can be seen from FIG. 17.

One hundred persons, who had been selected at random, participated in experiment on the light-scattering display panel according the sixth aspect. In the experiment, the maximum luminance was gradually increased from 10 cd/m² to 100 cd/m², and black and white were displayed at contrast varied from 1.2:1 to 100:1 by changing luminance Y. It was found that all participants could distinguish the black and the white, one from the other, when the contrast was 2:1 or more. This result can be well supported by FIG. 18 which shows that black and white are recognized by human eyes if the image contrast is at least 1.3:1 at psychometric lightness L. These conditions have been derived from Equation (I).

In the light-scattering display panel according the sixth aspect, the colors the filter layer provided on the first substrate are limited. Assuming that the color filter layer is too dark, the advantage of the present invention cannot be attained if the ratio in area of any pixel covered with the filter layer to any pixel not covered with the filter layer is very low. If this ratio is extremely high, the white or any color will be greatly influenced.

To solve this problem, the inventors made profound studies. They found that the following Equation (II) be satisfied in order to it necessary to achieve the advantage of the invention.

$$71 \leq M \leq 100 \quad (II)$$

where M is the product of the luminous transmittance T1' of the color filter layer on the first substrate and the area ratio D (D≦1) of this color filter layer to the non-pixel region of the first substrate. The luminous transmittance of 71% corresponds to a luminous reflectance of 50%.

Based on this finding of the inventors' is the seventh aspect of the present invention. The seventh aspect will be explained, with reference to the pixel arrangement illustrated in FIG. 13.

To produce red, the first and third pixels are maintained in non-scattering state, while the second and fourth pixels are energized to scatter light. To produce yellow, the first and second pixels are set in non-scattering state, while the third and fourth pixels are energized to scatter light. Should the third pixel fail to satisfy Equation (II), the red produced would be more luminous than the yellow. To maintain good contrast it is necessary to decrease the high luminous reflectance of the green-emitting pixel to 50% or less of the luminous reflectance of the existing light-transmitting type display. If the red- and blue-emitting pixels of the light-transmitting type display have luminous reflectances of 25% and 15%, respectively, the device will utilize 56.25% of light when it produces red, and will also use 56.25% of light when it produces yellow provided that the product M for the fourth pixel is 71%. If the product M for the fourth pixel is less than 71%, the red will be more luminous than the yellow as seen from FIG. 19.

Similar inversion in brightness may occur between yellow and green. It is more difficult for man to distinguish these two colors than to distinguish red from yellow or vise versa. This, in a region satisfying Equation (II), the difference in luminance between yellow and green is not so great. Particularly in the pixel arrangement shown in FIG. 13, it is the green-emitting pixel and the yellow-emitting pixel that produce a color generally recognized as green. The green and the yellow, both produced by the panel shown in FIGS. 12 and 13, may be recognized as the same color.

If the product M exceeds 100%, the white the panel produces when all pixels are energized and scatter light will have color components. In the case of the panel shown in FIGS. 12 and 13, the white produced has conspicuous yellow components, which degrade the color image. Hence, to produce yellow, cyan, magenta and green light beams, the panel must have filters arranged in the pixel portions of the light-scattering medium layer, or a light-scattering element containing a dye of the color to produce must be incorporated in each pixel portion of the light-scattering medium layer.

The eighth aspect of the this invention will now be described in detail, with reference to FIGS. 12, 13 and 20. The eighth aspect is based on the inventors' finding that a pixel can effectively produce yellow when energized and scatters light by using types of color filters and one yellow filter.

FIG. 12 shows a light-scattering display panel according the eighth aspect. As FIG. 12 illustrates, the panel comprises a first substrate 1, a second substrate 2, a yellow filter 3, red filter, green and blue filters 4, and a layer of light-scattering medium 5. The filters 4 are mounted on the inner surface of the second substrate 2. The yellow filter 3 is mounted on the inner surface of the first substrate 1 and located above the first black filter. The light-scattering medium 5 is interposed between the substrates 1 and 2. The panel can produce a sufficiently luminous yellow, which can hardly be produced by means of subtractive color mixing.

The four portions of the medium 5, which are located on the color filters 4 work as pixels. of these pixels, the third is located on the first blue (black) filter and covered with the yellow filter 3. Alternatively, the third pixel may incorporate a light-scattering element containing a yellow dye.

FIG. 20 represents the relationship between the wavelength of light and the transmittance a color filter exhibits to that light. As can be understood from FIG. 20, the panel will display an image of low contrast if a green filter which exhibits the maximum transmittance to light having a wavelength 545 nm and high visibility is provided on the second substrate to produce black. To have its luminous reflectance reduced, the green filter used for producing black needs to exhibit the maximum transmittance to light whose wavelength ranges from 500 nm to 535 nm and transmittance of 5 to 50% to light having a wavelength of 545 nm. Then, the panel can display color images at a sufficient contrast. If the green filter has the highest transmittance to light having a wavelength of less than 500 nm, the panel cannot produce green. On the other hand, if the green filter has the highest transmittance to light having a wavelength of less than 500 nm, the advantage of the invention cannot be attained.

Preferably, the green filter has the highest transmittance to light whose wavelength ranges from 520 nm to 530 nm. Then, the advantage of the invention can be achieved most efficiently. The green filter must have transmittance of 50% or less to the 545 nm light which has the highest visibility, in order that the advantage of the invention is attained. To produce a high-luminance color, it is desirable that the green filter exhibit a transmittance of 5% or less to the light having wavelength of 545 nm. Particularly preferred is a transmittance ranging from 10% to 20%.

When the maximum transmittance the green filter exhibits to the 545 nm light is decreased, the yellow filter 3 provided on the first substrate 1 needs to have a transmittance of at least 80% to the 545 nm light. If the transmittance is less than 80%, the panel will produce yellow light but in an inadequate amount.

One measure that may be taken in the eighth aspect in order to accomplish a light-scattering effect is to provide a light-scattering layer at the back of the color filter layer. Another measure is to impart light-scattering power to the color filter layer, by one of two alternative method. The first method is to introduce light-scattering grains into the entire color filter layer or selected portions thereof. The second method is to form pits in the surface of the color filter layer.

The grains changes the paths of light in the color filter layer, so that the light can be used more effectively to produce a color. It is desirable that the grains be distributed more sparsely in the surface facing an observer than the surface facing away from the observer. Due to the pits formed in the surface of the color filter layer, the layer receives light beams coming in various directions, increasing the amount of light that can be used to produce a color.

The ninth aspect of the present invention will now be described in detail, which encompasses with two types of light-scattering display panels. The first type will be described with reference to FIGS. 21 and 22, and the second type will be described with reference to FIGS. 23 and 24.

The first type panel is designed based on the inventors' finding that various colors, each having high purity and high luminance, can be produced by using three types of color filters, one yellow filter and one green filter which are arranged in the specific manner shown in FIGS. 21 and 22.

As FIG. 21 shows, the first type panel comprises a first substrate 1, a second substrate 2, yellow and green filters 3, red, blue and magenta filters 4, and a layer of light-scattering medium 5. The filters 4 are mounted on the inner surface of the second substrate 2. The yellow filter and the green filter are mounted on the inner surface of the first substrate 1 and located above the second blue filter and the magenta filter, respectively. The light-scattering medium 5 is interposed between the substrates 1 and 2.

The four portions of the medium 5, which are located on the color filters 4 work as pixels. Each pixel scatters light when it is energized, and remains in non-scattering state unless it is energized. As can be understood from FIG. 22, the first to fourth pixels are arranged on the red filter, the first blue filter, the second blue filter and the magenta filter, respectively. When the third pixel is energized to scatter light, yellow is produced by virtue of the yellow filter 3 covering the third pixel. When the fourth pixel is energized to scatter light, green is produced by virtue of the green filter 3 covering the fourth pixel.

A preferred ratio in area among the first to fourth pixels is 1:1:1:1, so that the panel may produce colors over a broad wavelength range. That is, the ratio in area among the red filter, the blue filters and the magenta filter should be 1:2:1. The third and fourth pixels may be smaller or larger than the first and second pixels. If they are smaller, the wavelength range over which the panel can produce colors will broaden. If they are larger, the black-to-white contrast will increase.

To produce yellow, cyan and magenta light beams, the panel must have filters arranged in the pixel portions of the light-scattering medium layer, or a light-scattering element containing a dye of the color to produce must be incorporated in each pixel portion of the light-scattering medium layer 5.

The second type panel is designed based on the inventors' finding that various colors, each having high purity and high luminance, can be produced by using four types of color filters, one yellow filter and one green filter which are arranged in the specific manner shown in FIGS. 23 and 24.

As FIG. 23 shows, the first type panel comprises a first substrate 1, a second substrate 2, yellow and green filters 3, red, blue and magenta filters 4, and a layer of light-scattering medium 5. The filters 4 are mounted on the inner surface of the second substrate 2. The yellow filter and the green filter are mounted on the inner surface of the first substrate 1 and located above the second blue filter and the magenta filter, respectively. The light-scattering medium 5 is interposed between the substrates 1 and 2.

The five portions of the medium 5, which are located on the color filters 4 work as pixels. Each pixel scatters light when it is energized, and remains in non-scattering state unless it is energized. As can be understood from FIG. 24, the first to fifth pixels are arranged on the red filter, the first blue filter, the first magenta filter, the second blue filter and the second magenta filter, respectively. When the fourth pixel is energized to scatter light, yellow is produced by virtue of the yellow filter 3 covering the fourth pixel. When the fifth pixel is energized to scatter light, green is produced by virtue of the green filter 3 covering the fifth pixel.

A preferred ratio in area among the first to fifth pixels is 1:1:1:1:1, so that the panel may produce colors over a broad wavelength range. That is, the ratio in area among the red filter, the blue filters and the magenta filters should be 1:2:2. The fourth and fifth pixels may be smaller or larger than the first, second and third pixels. If they are smaller, the wavelength range over which the panel can produce colors will broaden. If they are larger, the black-to-white contrast will increase.

In the first and second type panels, both according to the ninth aspect, has no black-emitting pixels. Nonetheless, black filters may be provided on the first substrate, so that the panel may emit black when the pixels covered by the black filters are energized and scatter light.

With either type of the light-scattering display panel it is desirable that the yellow-emitting pixel and the green-emitting pixel have a sufficiently high luminous reflectance and exhibit a transmittance of 80% or more to light having wavelength of 545 nm. If the transmittance is less than 80%, two color filters arranged one above the other will allow passage of only 64% of the 545 nm light. In this case, the panel cannot produce a high-luminance color.

The tenth aspect of the present invention will be described in detail, which encompasses two types of light-scattering display panels. The first type will be described with reference to FIGS. 25 and 26, and the second type will be described with reference to FIGS. 27 and 28.

The first type panel according to the tenth aspect is designed based on the inventors' finding that various colors, each having high purity and high luminance, can be produced by using three types of color filters, one yellow filter and one cyan filter which are arranged in the specific manner shown in FIGS. 25 and 26.

As FIG. 25 illustrates, the first type panel comprises a first substrate 1, a second substrate 2, cyan and yellow filters 3, red, green and blue filters 4, and a layer of light-scattering medium 5. The filters 4 are mounted on the inner surface of the second substrate 2. The cyan and yellow filters 3 are mounted on the inner surface of the first substrate 1 and located above the second red filter and the second blue filter, respectively. The light-scattering medium 5 is interposed between the substrates 1 and 2.

The five portions of the medium 5, which are located on the color filters 4 work as pixels. Each pixel scatters light when it is energized, and remains in non-scattering state unless it is energized. As can be understood from FIG. 26, the first to fifth pixels are arranged on the first red filter, the first green filter, the first blue filter, the second red filter and the second blue filter, respectively. When the fourth pixel is energized to scatter light, cyan is produced by virtue of the cyan filter 3 covering the fourth pixel. When the fifth pixel is energized to scatter light, yellow is produced by virtue of the yellow filter 3 covering the fifth pixel.

A preferred ratio in area among the first to fifth pixels is 1:1:1:1:1, so that the panel may produce colors over a broad wavelength range. That is, the ratio in area among the red filters, the green filter, and the blue filters should be 2:1:2. The fourth and fifth pixels may be smaller or larger than the first and second pixels. If they are smaller, the wavelength range over which the panel can produce colors will broaden. If they are larger, the black-to-white contrast will increase.

To produce yellow, cyan and magenta light beams, the panel must have filters arranged in the pixel portions of the light-scattering medium layer, or a light-scattering element containing a dye of the color to produce must be incorporated in each pixel portion of the light-scattering medium layer 5.

Figure 27:
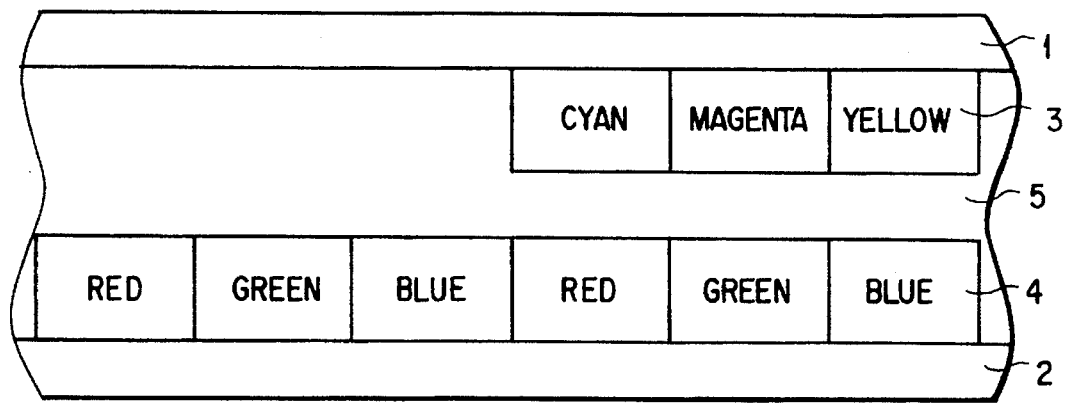

The second type panel according to the tenth aspect is designed based on the inventors' finding that various colors, each having high purity and high luminance, can be produced by using three types of color filters, a cyan filter, a magenta filter, and a yellow filter which are arranged in the specific manner shown in FIGS. 27 and 28.

As is shown in FIG. 27, the first type panel comprises a first substrate 1, a second substrate 2, yellow and green filters 3, red, blue and magenta filters 4, and a layer of light-scattering medium 5. The filters 4 are mounted on the inner surface of the second substrate 2. The yellow filter and the green filter are mounted on the inner surface of the first substrate 1 and located above the second blue filter and the magenta filter, respectively. The light-scattering medium 5 is interposed between the substrates 1 and 2.

The six portions of the medium 5, which are located on the color filters 4 work as pixels. Each pixel scatters light when it is energized, and remains in non-scattering state unless it is energized. As can be understood from FIG. 28, the first to sixth pixels are arranged on the first red filter, the first green filter, the first blue filter, the second red filter, the second green filter and the second blue filter, respectively. When the fourth pixel is energized to scatter light, cyan is produced by virtue of the cyan filter 3 covering the fourth pixel. When the fifth pixel is energized to scatter light, magenta is produced by virtue of the magenta filter 3 covering the fifth pixel. Further, when the sixth pixel is energized to scatter light, yellow is produced by virtue of the yellow filter 3 covering the sixth pixel.

A preferred ratio in area among the first to sixth pixels is 1:1:1:1:1:1, so that the panel may produce colors over a broad wavelength range. That is, the ratio in area among the red filters, the blue filters and the blue filters should be 1:1:1. The fourth and sixth pixels may be smaller or larger than the first, second and third pixels. If they are smaller, the wavelength range over which the panel can produce colors will broaden. If they are larger, the black-to-white contrast will increase.

Various examples of the present invention will be described in detail.

EXAMPLES 1 to 4

Examples 1 to 4, which will be described below, are TFT-LCD panels according to the first aspect of the present invention.

EXAMPLE 1

Figure 35:
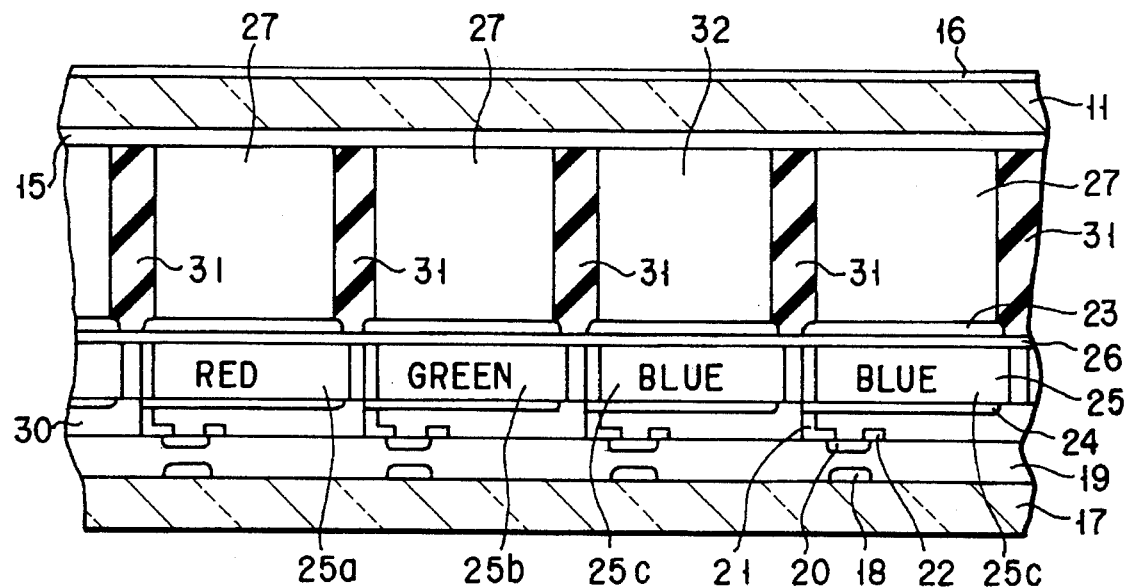
FIG. 35 is a sectional view depicting a part of another TFT-LCD panel according to the third aspect of the present invention.

FIG. 29 shows a TFT-LCD panel which is the first example of the invention. As shown in FIG. 35, the TFT-LCD panel comprises two transparent substrates 11 and 17. The substrates 11 and 17 are located parallel to each other and one above the other.

An yellow filter layer 12 is provided on one major surface of the first transparent substrate 11. Light-shielding films 13 are provided on the major surface of the first substrate 11 and arranged in a specific manner, defining the boundaries of pixels. The films 13 therefore prevent color mixing. A protective film 14 made of acrylic resin or the like is provided on the major surface of the first substrate 11, covering and protecting the yellow filter 12 and the light-shielding films 13. A transparent electrode 15 is provided on the protective film 14. A reflection-preventing film 16, which is a laminated one, is provided on the other major surface of the first substrate 11.

Gate electrodes 18 (gate lines) are arranged on a major surface of the second transparent substrate 17. A gate-insulating film 19 is formed on the major surface of the second substrate 17, covering the gate electrodes 18. A plurality of a-Si layers 20 are formed in the surface of the gate-insulating film 19. Source electrodes 21 and the drain electrodes 22 (signal lines) are provided on the gate-insulating film 19. Each source electrode 21 contacts one a-Si layer 20, and so does each drain electrode 22. The source electrodes 21 are electrically connected to pixel electrodes 23. The gate electrodes 18, the gate-insulating film 19, the a-Si layers 20, the source electrodes 21a and the drain electrodes 22 constitute a plurality of TFTs (Thin-Film Transistors).

An insulating film 30 made of polyimide resin is provided on the gate-insulating film 19, covering the a-Si layers 20, the source electrodes 21 and the drain electrodes 22. Light-scattering films 24 are formed in the surface of the insulating film 30. A color filter layer 25 is provided on the light-scattering films 24, in one-to-one correspondence. A protective film 26 made of acrylic resin or the like is formed on the color filter layer 25. It is on this protective film 26 that the pixel electrodes 23 are provided.

A layer 27 of light-scattering medium is interposed between the transparent substrates 11 and 17. The medium is made of, for example, polymer-dispersed liquid crystal. It is preferable that the light-scattering films 24 be formed of electrically conductive materials such as aluminum. The color filter layer 25 is divided into a magenta region 25a, a cyan region 25b and two black regions 25c. The ratio in area among the region 25a, the region 25b and the regions 25c is 1:1:2.

A TFT-LCD panel of the type shown in FIG. 29 was actually manufactured in the following way.

First, an insulating film 30 of polyimide resin was formed on a transparent substrate 17 with TFTs already fabricated on it. An aluminum film, 1000 angstroms thick, was vapor-deposited on the insulating film 30, thereby forming light-scattering films 24. Next, a color filter layer 25 made of dye-dispersed resist and having a thickness of 2 μm was formed on the light-scattering films 24. The layer 25 was patterned, thereby forming a magenta region 25a, a cyan region 25b and two black regions 25c.

Then, urethane acrylate was coated on the color filter layer 25 and cured, forming a protective film 26 having a thickness of 1500 angstroms. Then, resist was coated on the protective film 26, forming a resist layer. Holes having a diameter of 2 μm were made in the resist layer. Using the resist layer as an etching mask, RIE (Reactive Ion Etching) was performed on the protective film 26, the color filter layer 25 and the light-scattering films 24. Vertical holes were thereby formed in the films 24, layer 25 and the film 26, reaching the source electrodes 21 of the TFTs. Each vertical hole flared toward to the top. ITO was then vapor-deposited on the protective film 26, forming pixel electrodes 23 having a thickness of 1000 angstroms and filling the vertical holes made in the films 24, layer 25 and the film 26. The pixel electrodes 23 were, therefore, electrically connected to the source electrodes 21 of the TFTs.

Thereafter, a yellow-colored film, i.e., a yellow filter 12, was bonded to that part of the first substrate 11 which is to oppose the first black region 25c equivalent to the third pixel illustrated in FIG. 2. Instead, the yellow-colored film may be bonded to the transparent electrode 15, after the protective film 14 has been formed on the substrate 11 and the electrode 15 has been formed on the film 14.

Next, light-shielding films 13 made of chromium oxide were formed on the first substrate 11, defining the boundaries of pixels. A protective film 14 of acrylic resin, 1500 angstroms thick, was formed on the first substrate 11, covering and protecting the yellow filter 12 and the light-shielding films 13. Further, ITO was vapor-deposited on the protective film 14, forming a transparent electrode 15 having a thickness of 1000 angstroms. A reflection-preventing film 16, 2 μm thick, was formed on that surface of the first substrate 11 which faces away from the transparent electrode 15.

Further, 100 parts by weight of an epoxy resin, Epon 812 (trade name, manufactured by Polyscience, Inc.) used as matrix, 100 parts by weight of a curing agent Capcure 3-800 (trade name, manufactured by Wilmington Chemical, Inc.), and 200 parts by weight of liquid crystal, E-7 (trade name, manufactured by BDH, Inc.) were mixed, thereby preparing a light-scattering medium.

The first and second substrates 11 and 17 were positioned parallel to each other and spaced apart from each other—with the transparent electrode 15 opposing the pixel electrodes 23. A ring-shaped spacer (not shown) having an outer diameter of 20 μm was interposed between the substrates 11 and 17, providing a closed space. This space was filled with the light-scattering medium, thereby forming a layer 27 of light-scattering medium. The resultant structure was heated at 60° C. for 30 minutes, heated to 100° C. and maintained at 100° C. for 10 minutes. A TFT-LCD panel of FIG. 29 was made.

The TFT-LCD panel, thus made, was tested. More specifically, a voltage of 10 V was applied between the transparent electrode 15 and pixel electrodes 23. The panel produced high-luminance colors. The panel was found to utilize 30% of external light to produce various colors.

EXAMPLE 2

Another TFT-LCD panel of the type shown in FIG. 29 was manufactured in the following way.

First, TFT switching elements were mounted on a transparent substrate 17. Further, pixels shown in FIG. 29 were formed on this transparent substrate. More precisely, an insulating film 30 of polyimide resin was formed on the substrate 17 with TFTs already fabricated on it. An aluminum film, 1000 angstroms thick, was vapor-deposited on the insulating film 30, thereby forming light-scattering films 24. Next, a color filter layer 25 was formed by the same printing technique as employed in Example 1. The layer 25 was patterned into color filter regions arranged as shown in FIG. 4.

Then, urethane acrylate was coated on the color filter layer 25 and cured, forming a protective film 26 having a thickness of 1500 angstroms. Resist was coated on the protective film 26, thus forming a resist layer. Circular holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26, each hole reaching the source electrodes 21 of the TFTs and flared toward to the top. ITO was then vapor-deposited on the protective film 26, forming pixel electrodes 23 having a thickness of 1000 angstroms and filling the vertical holes. The pixel electrodes 23 were electrically connected by the light-scattering films 24 to the source electrodes 21 of the TFTs.

Next, a yellow-colored film 12 having a thickness of 2 μm was bonded to that part of the first substrate 11 which is to oppose the first black region 25c equivalent to the third pixel illustrated in FIG. 2. Black-colored films 13 were formed on the first substrate 11, defining the boundaries of pixels. A protective film 14 was formed on the first substrate 11, covering and protecting the yellow filter 12 and the black-colored films 13. Further, ITO was vapor-deposited on the protective film 14, forming a transparent electrode 15 having a thickness of 1000 angstroms. A reflection-preventing film 16, which had a thickness of 2 μm and low refractive index, was formed on that surface of the first substrate 11 which faces away from the transparent electrode 15.

Further, Epon 812 used as matrix and Capcure 3-800 used as curing agent were mixed, in ratio of 1:1, thus preparing a composition. This composition and liquid crystal E-7 were mixed together, in ratio of 1:2, preparing a light-scattering medium.

Thereafter, the first and second substrates 11 and 17 were positioned parallel to each other and spaced apart from each other—with the transparent electrode 15 opposing the pixel electrodes 23. A ring-shaped spacer (not shown) having an outer diameter of 20 μm was interposed between the substrates 11 and 17, providing a closed space. This space was filled with the light-scattering medium, thereby forming a layer 27 of light-scattering medium. The resultant structure was heated at 50° C. for 20 minutes, heated to 90° C. and maintained at 90° C. for 5 minutes. A TFT-LCD panel of FIG. 29 was made.

This TFT-LCD panel, thus made, was tested. To be more specific, a voltage of 15 V was applied between the transparent electrode 15 and pixel electrodes 23. The panel produced high-luminance colors. The panel was found to utilize 30% of external light to produce various colors.

EXAMPLE 3

A phase-change type TFT-LCD panel having the structure shown in FIG. 33 was manufactured in the following way.

Figure 6:
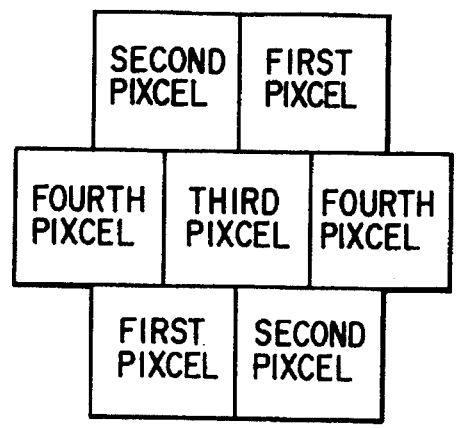
Figure 7:
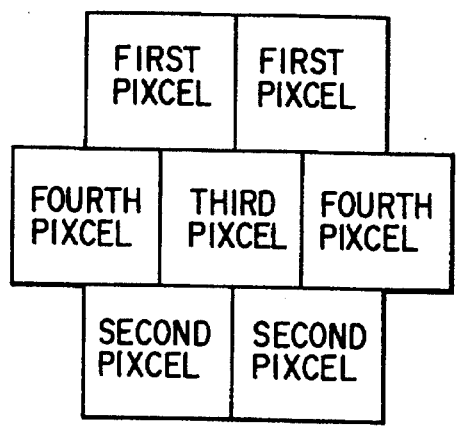

First, TFT switching elements were mounted on a transparent substrate 17. Further, pixels shown in FIG. 33 were formed on this transparent substrate. More precisely, a resist layer, 2.5 μm thick, was formed on the source electrodes of the TFTs and patterned. Using the patterned resist layer as mask, copper columns were formed by means of plating. An insulating film 30 was formed on the substrate 17. An aluminum film, 1000 angstroms thick, was vapor-deposited on the insulating film 30, thereby forming light-scattering films 24. Next, a color filter layer 25 was formed by printing technique. The layer 25 was patterned into color filter regions arranged as shown in FIG. 6 and each having a size of 40×40 μm.

Then, acrylate was coated on the color filter layer 25 and cured, forming a protective film 26 having a thickness of 1500 angstroms. ITO was then vapor-deposited on the protective film 26, forming pixel electrodes 23 having a thickness of 1000 angstroms. The pixel electrodes 23 were electrically connected by the light-scattering films 24 to the source electrodes 21 of the TFTs. Resist having black pigment dispersed in it was applied, forming walls 31 which were 10 μm high and which were to surround pixels.

Thereafter, ITO was vapor-deposited on the other transparent substrate 11, forming a transparent electrode 15 having a thickness of 1000 angstroms. A reflection-preventing film 16, which had a thickness of 2 μm and low refractive index, was formed on that surface of the first substrate 11 which faces away from the transparent electrode 15.

Next, the first and second substrates 11 and 17 were positioned parallel to each other and spaced apart from each other—with the transparent electrode 15 opposing the pixel electrodes 23. Cholesteric liquid crystal (d/p=3) containing yellow dye was filled in a third-pixel space, whereas cholesteric liquid crystal containing no dyes was filled in the other pixel spaces. As a result, a phase-change type TFT-LCD panel was manufactured.

The phase-change type TFT-LCD panel, thus made, was tested. To be more specific, a voltage of 15 V was applied between the transparent electrode 15 and pixel electrodes 23. The panel produced high-luminance colors. The panel was found to utilize 30% of external light to produce various colors.

EXAMPLE 4

Another phase-change type TFT-LCD panel having the structure shown in FIG. 33 was manufactured in the following method.

Figure 33:
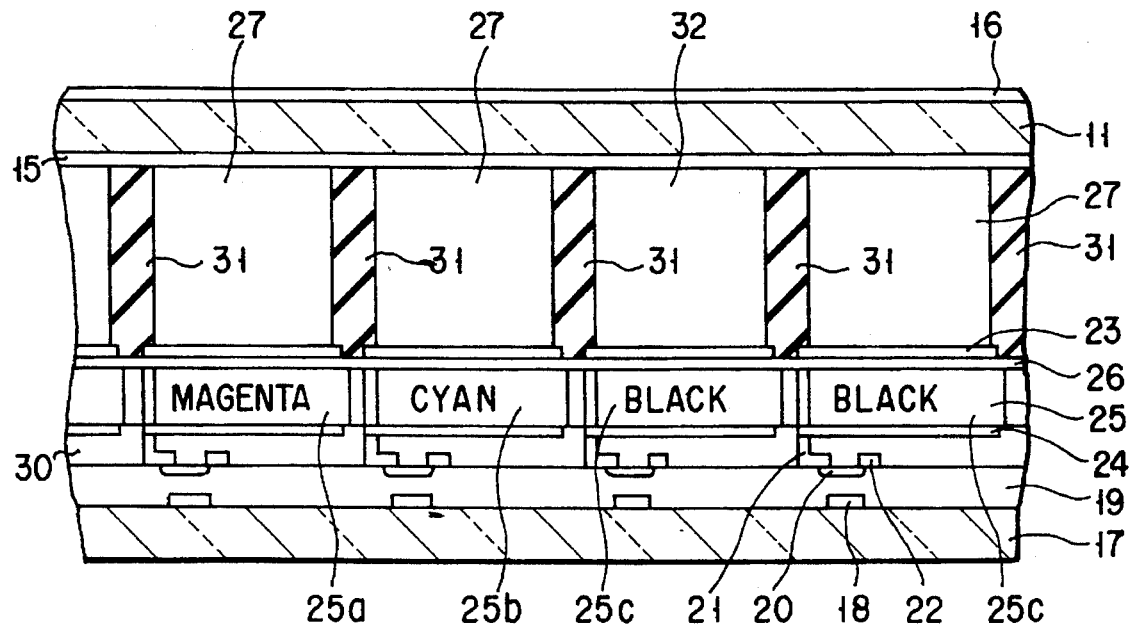
FIG. 33 is a sectional view showing a part of another TFT-LCD panel according to the first aspect of the present invention.

First, TFT switching elements were mounted on a transparent substrate 17, and pixels shown in FIG. 33 were formed on this transparent substrate. To state more precisely, an insulating film 30 was formed on the substrate 17. An aluminum film, 1000 angstroms thick, was vapor-deposited on the insulating film 30, thereby forming light-scattering films 24. Next, a color filter layer 25 was formed by printing technique. The layer 25 was patterned into color filter regions arranged as shown in FIG. 6 and each having a size of 40×40 μm.

Then, urethane acrylate was coated on the color filter layer 25 and cured, forming a protective film 26 having a thickness of 1500 angstroms. Resist was coated on the protective film 26, thus forming a resist layer. Circular holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26, each hole reaching the source electrodes 21 of the TFTs and flared toward to the top. ITO was then vapor-deposited on the protective film 26, forming pixel electrodes 23 having a thickness of 1000 angstroms. The pixel electrodes 23 were electrically connected by the light-scattering films 24 to the source electrodes 21 of the TFTs. Resist having black pigment dispersed in it was applied, forming walls 31 which were 10 μm high and which were to surround pixels.

Thereafter, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Smectic A liquid crystal containing yellow dye was filled in a third-pixel space, whereas smectic A liquid crystal containing no dyes was filled in the other pixel spaces. As a result, a phase-change type TFT-LCD panel was manufactured.

The phase-change type TFT-LCD panel, thus made, was tested. To state more specifically, a voltage of 20 V was applied between the transparent electrode 15 and pixel electrodes 23. The panel produced high-luminance colors. The panel was found to utilize 30% of external light to produce various colors.

EXAMPLES 5 to 8

Examples 5 to 8, which will be described below, are TFT-LCD panels which are based on the second aspect of the invention.

EXAMPLE 5

A polymer-dispersed type TFT-LCD panel having the structure shown in FIG. 30 was manufactured in the following way.

First, an insulating film 30 was formed on a transparent substrate 17 with TFTs already provided on it. Aluminum was vapor-deposited on the insulating film 30 to a thickness of 1000 angstroms, forming light-scattering films 24. Next, a color filter layer 25 made of dye-dispersed resist and having a thickness of 2 μm was formed on the light-scattering films 24. The layer 25 was patterned, thereby forming a magenta region 25a, a cyan region 25b, a red region 25d and two blue regions 25e, as illustrated in FIG. 11.

Then, urethane acrylate was coated on the color filter layer 25 and cured, forming a protective film 26 having a thickness of 1500 angstroms. Then, resist was coated on the protective film 26, forming a resist layer. Holes having a diameter of 2 μm were made in the resist layer. Using the resist layer as an etching mask, RIE (Reactive Ion Etching) was performed on the protective film 26, the color filter layer 25 and the light-scattering films 24. Vertical holes were thereby formed in the films 24, layer 25 and the film 26. Each hole reached the source electrodes 21 of the TFTs and flared toward to the top. ITO was then vapor-deposited on the protective film 26, forming pixel electrodes 23 having a thickness of 1000 angstroms and filling the vertical holes made in the films 24, layer 25 and the film 26. The pixel electrodes 23 were, therefore, electrically connected to the source electrodes 21 of the TFTs.

Thereafter, a yellow-colored film, i.e., a yellow filter 12, was bonded to that part of the first substrate 11 which is to oppose the cyan region 25b equivalent to the third pixel illustrated in FIG. 2. Instead, the yellow-colored film may be bonded to the transparent electrode 15, after the protective film 14 has been formed on the substrate 11 and the electrode 15 has been formed on the film 14.

Then, light-shielding films 13 made of black resin were formed on the first substrate 11, defining the boundaries of pixels. A protective film 14 of acrylic resin, 1500 angstroms thick, was formed on the first substrate 11, covering and protecting the yellow filter 12 and the light-shielding films 13. Further, ITO was vapor-deposited on the protective film 14, forming a transparent electrode 15 having a thickness of 1000 angstroms. A reflection-preventing film 16, 2 µm thick, was formed on that surface of the first substrate 11 which faces away from the transparent electrode 15.

Further, 100 parts by weight of Epon 812 used as matrix, 100 parts by weight of Capcure 3-800 used as curing agent, and 200 parts by weight of liquid crystal E-7 were mixed, thereby preparing a light-scattering medium.

The first and second substrates 11 and 17 were positioned parallel to each other and spaced apart from each other—with the transparent electrode 15 opposing the pixel electrodes 23. A ring-shaped spacer (not shown) having an outer diameter of 20 µm was interposed between the substrates 11 and 17, providing a closed space. This space was filled with the light-scattering medium, thereby forming a layer 27 of light-scattering medium. The resultant structure was heated at 60° C. for 30 minutes, heated to 100° C. and maintained at 100° C. for 10 minutes. A polymer-dispersed type TFT-LCD panel of FIG. 30 was made.

The polymer-dispersed type TFT-LCD panel was tested. To be more precise, a voltage of 20 V was applied between the transparent electrode 15 and pixel electrodes 23. The panel produced high-luminance colors. The panel was found to utilize 30% of external light to produce various colors.

EXAMPLE 6

A polymer-dispersed type TFT-LCD panel having the structure shown in FIG. 30 was manufactured in the following way.

First, TFT switching elements were mounted on a transparent substrate 17, thereby to form pixels shown in FIG. 30 on this transparent substrate. More precisely, an insulating film 30 was formed on the substrate 17. An aluminum film, 1000 angstroms thick, was vapor-deposited on the insulating film 30, thereby forming light-scattering films 24. Next, a color filter layer 25 was formed by the same method as in Example 1. The layer 25 was patterned into color filter regions arranged as shown in FIG. 4.

Then, urethane acrylate was coated on the color filter layer 25 and cured, forming a protective film 26 having a thickness of 1500 angstroms. Resist was then coated on the protective film 26, forming a resist layer. Holes having a diameter of 2 µm were made in the resist layer. Using the resist layer as an etching mask, RIE (Reactive Ion Etching) was performed on the protective film 26, the color filter layer 25 and the light-scattering films 24. Vertical holes were thereby formed in the films 24, layer 25 and the film 26. Each hole reached the source electrodes 21 of the TFTs. Copper columns were formed in the holes by means of plating. ITO was vapor-deposited on the protective film 26, forming pixel electrodes 23 having a thickness of 1000 angstroms and a size of 50×50 µm. The pixel electrodes 23 were electrically connected by the light-scattering films 24 to the source electrodes 21 of the TFTs.

Next, a yellow-colored film 12 having a thickness of 2 µm was formed on that part of the first substrate 11 which is to oppose the third pixel. Black-colored films 13 having a thickness of 2 µm were formed on the first substrate 11, defining the boundaries of pixels. A protective film 14 was formed on the first substrate 11, covering and protecting the yellow filter 12 and the black-colored films 13. Further, ITO was vapor-deposited on the protective film 14, forming a transparent electrode 15 having a thickness of 1000 angstroms. A reflection-preventing film 16, which had a thickness of 2 µm and low refractive index, was formed on that surface of the first substrate 11 which faces away from the transparent electrode 15.

Further, Epon 812 used as a matrix, Devcon 5A (trade name, manufactured by Devcon, Inc.) used as a matrix, and Capcure 3-800 used as curing agent were mixed, in ratio of 1:1:2, thereby preparing a composition. This composition and liquid crystal E-7 were mixed together, in ratio of 1:2, preparing a light-scattering medium.

Next, the first and second substrates 11 and 17 were positioned parallel to each other and spaced apart from each other—with the transparent electrode 15 opposing the pixel electrodes 23. A ring-shaped spacer (not shown) having an outer diameter of 20 µm was interposed between the substrates 11 and 17, providing a closed space. This space was filled with the light-scattering medium, thus forming a layer 27 of light-scattering medium. The resultant structure was heated at 50° C. for 20 minutes, heated to 90° C. and maintained at 90° C. for 5 minutes. A polymer-dispersed type TFT-LCD panel was made which had the structure of FIG. 30.

The polymer-dispersed type TFT-LCD panel was tested. More specifically, a voltage of 20 V was applied between the transparent electrode 15 and pixel electrodes 23. The panel produced high-luminance colors. The panel was found to utilize 25% of external light to produce various colors.

EXAMPLE 7

A phase-change type TFT-LCD panel having the structure shown in FIG. 34 was manufactured in the following method.

Figure 5:
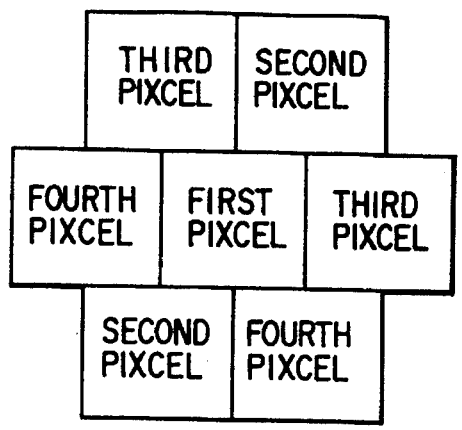
Figure 34:
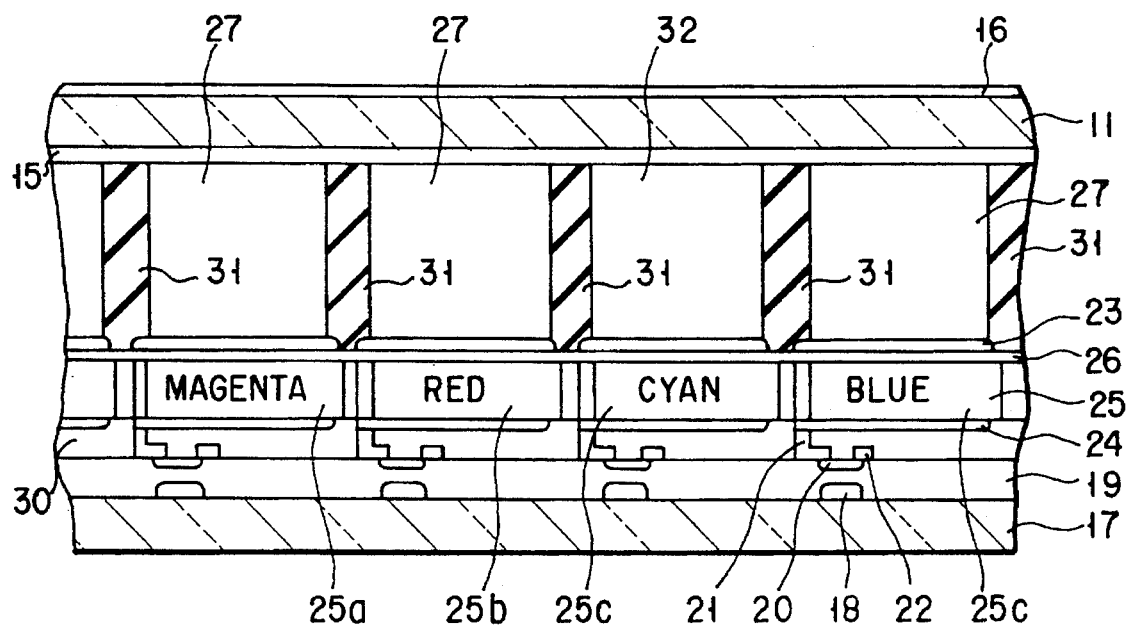
FIG. 34 is a sectional view showing a part of a TFT-LCD panel according to the second aspect of the invention.

First, TFT switching elements were mounted on a transparent substrate 17, and pixels shown in FIG. 34 were formed on this transparent substrate. To state more precisely, an insulating film 30 was formed on the substrate 17. An aluminum film, 1000 angstroms thick, was vapor-deposited on the insulating film 30, thereby forming light-scattering films 24. Next, a color filter layer 25 was formed by printing technique. The layer 25 was patterned into color filter regions arranged as shown in FIG. 5 and each having a size of 40×40 µm.

Then, acrylate was coated on the color filter layer 25 and cured, forming a protective film 26 having a thickness of 1500 angstroms. Resist was coated on the protective film 26, thus forming a resist layer. Circular holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26, each hole reaching the source electrodes 21 of the TFTs. Copper columns were formed in these holes. ITO was then vapor-deposited on the protective film 26, forming pixel electrodes 23 having a thickness of 1000 angstroms. The pixel electrodes 23 were electrically connected by the light-scattering films 24 to the source electrodes 21 of the TFTs. Resist having black pigment dispersed in it was applied, forming walls 31 which were 10 μm high and which were to surround pixels.

Thereafter, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Cholesteric liquid crystal (d/p=3) containing yellow dye was filled in a third-pixel space, whereas cholesteric liquid crystal containing no dyes was filled in the other pixel spaces. As a result, a phase-change type TFT-LCD panel was manufactured.

The phase-change type TFT-LCD panel, thus made, was tested. To state more specifically, a voltage of 15 V was applied between the transparent electrode 15 and pixel electrodes 23. The panel produced high-luminance colors. The panel was found to utilize 30% of external light to produce various colors.

EXAMPLE 8

A phase-change type TFT-LCD panel having the structure shown in FIG. 36 was manufactured in the following way.

Figure 40:
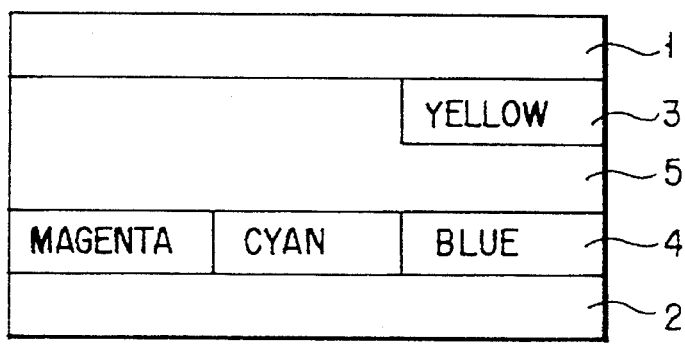

First, TFT switching elements were mounted on a transparent substrate 17, and pixels shown in FIG. 40 were formed on this transparent substrate. To state more precisely, a resist layer, 2.5 μm thick, was formed on the source electrodes of the TFTs and patterned. Using the patterned resist layer as mask, copper columns were formed by means of plating. An insulating film 30 was then formed on the substrate 17. An aluminum film, 1000 angstroms thick, was vapor-deposited on the insulating film 30, thereby forming light-scattering films 24. Next, a color filter layer 25 was formed by printing technique. The layer 25 was patterned into color filter regions arranged as shown in FIG. 6 and each having a size of 40×40 μm.

Then, urethane acrylate was coated on the color filter layer 25 and cured, forming a protective film 26 having a thickness of 1500 angstroms. ITO was then vapor-deposited on the protective film 26, forming pixel electrodes 23 having a thickness of 1000 angstroms. The pixel electrodes 23 were electrically connected to the source electrodes 21 of the TFTs. Resist having black pigment dispersed in it was applied, forming walls 31 which were 10 μm high and which were to surround pixels.

Thereafter, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Smectic A liquid crystal containing yellow dye was filled in a third-pixel space, whereas smectic A liquid crystal containing no dyes was filled in the other pixel spaces. As a result, a phase-change type TFT-LCD panel was manufactured.

The phase-change type TFT-LCD panel, thus made, was tested. More precisely, a voltage of 13 V was applied between the transparent electrode 15 and pixel electrodes 23, thereby heating the pixels. The panel produced high-luminance colors. The panel was found to utilize 25% of external light to produce various colors.

EXAMPLES 9 to 12

Examples 9 to 12, which will be described below, are TFT-LCD panels according to the third aspect of the present invention.

EXAMPLE 9

A polymer-dispersed type TFT-LCD panel having the structure shown in FIG. 31 was manufactured in the following way.

First, an insulating film 30 was formed on a transparent substrate 17 with TFTs already provided on it. Aluminum was vapor-deposited on the insulating film 30 to a thickness of 1000 angstroms, thereby forming light-scattering films 24. Next, a color filter layer 25 made of dye-dispersed resist and having a thickness of 2 μm was formed on the light-scattering films 24. The layer 25 was patterned, thereby forming a red region 25d, a green region 25f, two blue regions 25e, as illustrated in FIG. 13.

Then, urethane acrylate was coated on the color filter layer 25 and cured, forming a protective film 26 having a thickness of 1500 angstroms. Then, resist was coated on the protective film 26, forming a resist layer. Holes having a diameter of 2 μm were made in the resist layer. Using the resist layer as an etching mask, RIE (Reactive Ion Etching) was performed on the protective film 26, the color filter layer 25 and the light-scattering films 24. Vertical holes were thereby formed in the films 24, layer 25 and the film 26. Each hole reached the source electrodes 21 of the TFTs and flared toward to the top. ITO was then vapor-deposited on the protective film 26, forming pixel electrodes 23 having a thickness of 1000 angstroms and filling the vertical holes made in the films 24, layer 25 and the film 26. The pixel electrodes 23 were, therefore, electrically connected to the source electrodes 21 of the TFTs.

Thereafter, a yellow-colored film, i.e., a yellow filter 12, was bonded to that part of the first substrate 11 which is to oppose the first blue region 25e equivalent to the third pixel illustrated in FIG. 2. Instead, the yellow-colored film may be bonded to the transparent electrode 15, after the protective film 14 has been formed on the substrate 11 and the electrode 15 has been formed on the film 14.

Then, light-shielding films 13 made of chromium oxide were formed on the first substrate 11, defining the boundaries of pixels. A protective film 14 of urethane resin, 1500 angstroms thick, was formed on the first substrate 11, covering and protecting the yellow filter 12 and the light-shielding films 13. Further, ITO was vapor-deposited on the protective film 14, forming a transparent electrode 15 having a thickness of 1000 angstroms. A reflection-preventing film 16, which had a thickness of 2 μm and low refractive index, was formed on that surface of the first substrate 11 which faces away from the transparent electrode 15.

Further, 100 parts by weight of Epon 812 used as matrix, 100 parts by weight of Capcure 3-800 used as curing agent, and 200 parts by weight of liquid crystal E-7 were mixed, thereby preparing a light-scattering medium.

The first and second substrates 11 and 17 were positioned parallel to each other and spaced apart from each other—with the transparent electrode 15 opposing the pixel electrodes 23. A ring-shaped spacer (not shown) having an outer diameter of 20 μm was interposed between the substrates 11 and 17, providing a closed space. This space was filled with the light-scattering medium, thereby forming a layer 27 of light-scattering medium. The resultant structure was heated at 60° C. for 30 minutes, heated to 100° C. and maintained at 100° C. for 10 minutes. A polymer-dispersed type TFT-LCD panel of FIG. 31 was made.

The polymer-dispersed type TFT-LCD panel was tested. To be more precise, a voltage of 25 V was applied between the transparent electrode 15 and pixel electrodes 23. The panel produced high-luminance colors. The panel was found to utilize 30% of external light to produce various colors.

EXAMPLE 10

A polymer-dispersed type TFT-LCD panel having the structure shown in FIG. 31 was manufactured in the following way.

First, TFT switching elements were mounted on a transparent substrate 17, thereby to form pixels shown in FIG. 31. More precisely, an insulating film 30 was formed on the substrate 17. An aluminum film, 1000 angstroms thick, was vapor-deposited on the insulating film 30, thereby forming light-scattering films 24. Next, a color filter layer 25 was formed by using printing technique. The layer 25 was patterned into color filter regions arranged as shown in FIG. 14, each having a size of 50×50 μm.

Then, acrylate was coated on the color filter layer 25 and cured, forming a protective film 26 having a thickness of 1500 angstroms. Resist was then coated on the protective film 26, forming a resist layer. Holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26. Each hole reached the source electrodes 21 of the TFTs. Copper columns were formed in the holes by means of plating. ITO was vapor-deposited on the protective film 26, forming pixel electrodes 23 having a thickness of 1000 angstroms. The pixel electrodes 23 were electrically connected to the source electrodes 21 of the TFTs.

Next, a yellow-colored film 12 having a thickness of 2 μm was formed on that part of the first substrate 11 which is to oppose the third pixel. Black-colored films 13 having a thickness of 2 μm were formed on the first substrate 11, defining the boundaries of pixels. A protective film 14 was formed on the first substrate 11, covering and protecting the yellow filter 12 and the black-colored films 13. Further, ITO was vapor-deposited on the protective film 14, forming a transparent electrode 15 having a thickness of 1000 angstroms. A reflection-preventing film 16, which had a thickness of 2 μm and low refractive index, was formed on that surface of the first substrate 11 which faces away from the transparent electrode 15.

Further, Epon 812 used as a matrix, Devcon 5A used as a matrix, and Capcure 3-800 used as curing agent were mixed, in ratio of 1:1:2, thereby preparing a composition. This composition and liquid crystal E-7 were mixed together, in ratio of 1:2, preparing a light-scattering medium.

Next, the first and second substrates 11 and 17 were positioned parallel to each other and spaced apart from each other—with the transparent electrode 15 opposing the pixel electrodes 23. A ring-shaped spacer (not shown) having an outer diameter of 20 μm was interposed between the substrates 11 and 17, providing a closed space. This space was filled with the light-scattering medium, thus forming a layer 27 of light-scattering medium. The resultant structure was heated at 50° C. for 20 minutes, heated to 90° C. and maintained at 90° C. for 5 minutes. A polymer-dispersed type TFT-LCD panel was made which had the structure of FIG. 31.

The polymer-dispersed type TFT-LCD panel was tested. More specifically, a voltage of 20 V was applied between the transparent electrode 15 and pixel electrodes 23. The panel produced high-luminance colors. The panel was found to utilize 27% of external light to produce various colors.

EXAMPLE 11

A phase-change type TFT-LCD panel having the structure shown in FIG. 35 was manufactured in the following method.

Figure 8:
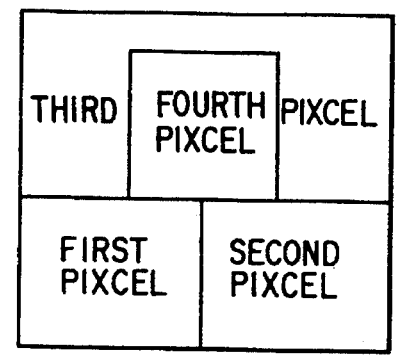

First, TFT switching elements were mounted on a transparent substrate 17, and pixels shown in FIG. 35 were formed on this transparent substrate. To state more precisely, a resist layer, 2.5 μm thick, was formed on the source electrodes of the TFTs and patterned. Using the patterned resist layer as mask, copper columns 31 were formed by means of plating. An insulating film 30 was formed on the substrate 17. An aluminum film, 1000 angstroms thick, was vapor-deposited on the insulating film 30, thereby forming light-scattering films 24. Next, a color filter layer 25 was formed by using printing technique. The layer 25 was patterned into color filter regions arranged as shown in FIG. 8, each having a size of 40×40 μm.

Thereafter, acrylate was coated on the color filter layer 25 and cured, forming a protective film 26 having a thickness of 1500 angstroms. ITO was then vapor-deposited on the protective film 26, forming pixel electrodes 23 having a thickness of 1000 angstroms. The pixel electrodes 23 were electrically connected to the source electrodes 21 of the TFTs. Resist having black pigment dispersed in it was applied, forming walls 31 which were 10 μm high and which were to surround pixels.

Next, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Cholesteric liquid crystal (d/p=3) containing yellow dye was filled in a third-pixel space, whereas cholesteric liquid crystal containing no dyes was filled in the other pixel spaces. As a result, a phase-change type TFT-LCD panel was manufactured.

The phase-change type TFT-LCD panel, thus made, was tested. To state more specifically, a voltage of 40 V was applied between the transparent electrode 15 and pixel electrodes 23. The panel produced high-luminance colors. The panel was found to utilize 33% of external light to produce various colors.

EXAMPLE 12

Another phase-change type TFT-LCD panel having the structure shown in FIG. 35 was manufactured in the following method.

Figure 9:
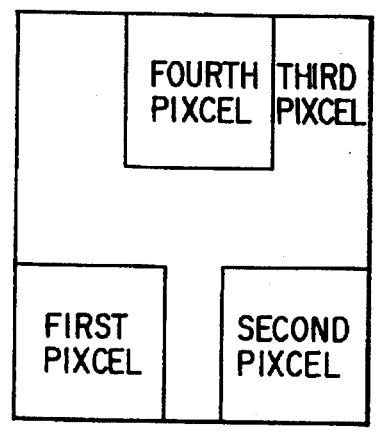

First, TFT switching elements were mounted on a transparent substrate 17, and pixels shown in FIG. 35 were formed on this transparent substrate. To state more precisely, an insulating film 30 was formed on the substrate 17. An aluminum film, 1000 angstroms thick, was vapor-deposited on the insulating film 30, forming light-scattering films 24. Further, a color filter layer 25 was formed by printing technique. The layer 25 was patterned into color filter regions arranged as shown in FIG. 9 and each having a size of 40×40 μm.

Then, urethane acrylate was coated on the color filter layer 25 and cured, forming a protective film 26 having a thickness of 1500 angstroms. Resist was coated on the protective film 26, thus forming a resist layer. Circular holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26. Each hole reached the source electrodes 21 of the TFTs and flared toward the top. ITO was then vapor-deposited on the protective film 26, pixel electrodes 23 having a thickness of 1000 angstroms. The pixel electrodes 23 were electrically connected to the source electrodes 21 of the TFTs. Resist having black pigment dispersed in it was applied, forming walls 31 which were 10 μm high and which were to surround pixels.

Thereafter, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Smectic A liquid crystal containing yellow dye was filled in a third-pixel space, whereas smectic A liquid crystal containing no dyes was filled in the other pixel spaces. As a result, a phase-change type TFT-LCD panel was manufactured.

The phase-change type TFT-LCD panel, thus made, was tested. To state more specifically, a voltage of 15 V was applied between the transparent electrode 15 and pixel electrodes 23. The panel produced high-luminance colors. The panel was found to utilize 30% of external light to produce various colors.

EXAMPLES 13 to 16

Examples 13 to 16, which will be described below, are TFT-LCD panels according to the fourth aspect of this invention.

EXAMPLE 13

A polymer-dispersed type TFT-LCD panel having the structure shown in FIG. 32 was manufactured in the following way.

First, an insulating film 30 was formed on a transparent substrate 17 with TFTs already provided on it. Aluminum was vapor-deposited on the insulating film 30 to a thickness of 1000 angstroms, thereby forming light-scattering films 24. Next, a color filter layer 25 made of dye-dispersed resist and having a thickness of 2 μm was formed on the light-scattering films 24. The layer 25 was patterned as shown in FIG. 13, thereby forming a magenta region 25a, a cyan region 25b, a blue region 25e and a red region 25d, as illustrated in FIG. 32.

Then, urethane acrylate was coated on the color filter layer 25 and cured, forming a protective film 26 having a thickness of 1500 angstroms. Then, resist was coated on the protective film 26, forming a resist layer. Circular holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26. Each hole reached the source electrodes 21 of the TFTs and flared toward to the top. ITO was then vapor-deposited on the protective film 26, forming pixel electrodes 23 having a thickness of 1000 angstroms and filling the vertical holes made in the films 24, layer 25 and the film 26. The pixel electrodes 23 were, therefore, electrically connected to the source electrodes 21 of the TFTs.

Thereafter, a yellow-colored film, i.e., a yellow filter 12, was bonded to that part of the first substrate 11 which is to oppose the cyan region 25b and the blue region 25e equivalent to the third and fourth pixels illustrated in FIG. 15. Instead, the yellow-colored film may be bonded to the transparent electrode 15, after the protective film 14 has been formed on the substrate 11 and the electrode 15 has been formed on the film 14.

Next, light-shielding films 13 made of chromium oxide were formed on the first substrate 11, defining the boundaries of pixels. A protective film 14 of urethane acrylate, 1500 angstroms thick, was formed on the first substrate 11, covering and protecting the yellow filter 12 and the light-shielding films 13. Further, ITO was vapor-deposited on the protective film 14, forming a transparent electrode 15 having a thickness of 1000 angstroms. A reflection-preventing film 16, which had a thickness of 2 μm and low refractive index, was formed on that surface of the first substrate 11 which faces away from the transparent electrode 15.

Further, 100 parts by weight of Epon 812 used as matrix, 100 parts by weight of Capcure 3-800 used as curing agent, and 200 parts by weight of liquid crystal E-7 were mixed, thereby preparing a light-scattering medium.

The first and second substrates 11 and 17 were positioned parallel to each other and spaced apart from each other—with the transparent electrode 15 opposing the pixel electrodes 23. A ring-shaped spacer (not shown) having an outer diameter of 20 μm was interposed between the substrates 11 and 17, providing a closed space. This space was filled with the light-scattering medium, thereby forming a layer 27 of light-scattering medium. The resultant structure was heated at 60° C. for 30 minutes, heated to 100° C. and maintained at 100° C. for 10 minutes. A polymer-dispersed type TFT-LCD panel of FIG. 32 was manufactured.

The polymer-dispersed type TFT-LCD panel was tested. To be more precise, a voltage of 20 V was applied between the transparent electrode 15 and pixel electrodes 23. The panel produced high-luminance colors. The panel was found to utilize 25% of external light to produce various colors.

EXAMPLE 14

A polymer-dispersed type TFT-LCD panel having the structure shown in FIG. 32 was manufactured in the following way.

First, TFT switching elements were mounted on a transparent substrate 17, thereby to form pixels shown in FIG. 32. To be more precise, an insulating film 30 was formed on the substrate 17. An aluminum film, 1000 angstroms thick, was vapor-deposited on the insulating film 30, thereby forming light-scattering films 24. Next, a color filter layer 25 was formed by printing technique. The layer 25 was patterned into color filter regions arranged as shown in FIG. 5, each having a size of 50×50 μm.

Then, urethane acrylate was coated on the color filter layer 25 and cured, forming a protective film 26 having a thickness of 1500 angstroms. Resist was then coated on the protective film 26, forming a resist layer. Holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26. Each hole reached the source electrodes 21 of the TFTs and flared toward to the top. ITO was vapor-deposited on the protective film 26, forming an ITO layer having a thickness of 1000 angstroms. The ITO layer was patterned, thereby forming pixel electrodes 23 having a size of 50×50 μm. The pixel electrodes 23 were electrically connected to the source electrodes 21 of the TFTs by the light-scattering films 24.

Next, a yellow-colored film 12 having a thickness of 2 μm was formed on that part of the first substrate 11 which is to oppose the third and fourth pixels. Black-colored films 13 having a thickness of 2 μm were formed on the first substrate 11, defining the boundaries of pixels. A protective film 14 was formed on the first substrate 11, covering and protecting the yellow filter 12 and the black-colored films 13. Further, ITO was vapor-deposited on the protective film 14, forming a transparent electrode 15 having a thickness of 1000 angstroms. A reflection-preventing film 16, which had a thickness of 2 μm and low refractive index, was formed on that surface of the first substrate 11 which faces away from the transparent electrode 15.

Further, Epon 812 used as a matrix, Devcon 5A used as a matrix, and Capcure 3-800 used as curing agent were mixed, in ratio of 1:1:2, thereby preparing a composition. This composition and liquid crystal E-7 were mixed together, in ratio of 1:2, preparing a light-scattering medium.

Next, the first and second substrates 11 and 17 were positioned parallel to each other and spaced apart from each other—with the transparent electrode 15 opposing the pixel electrodes 23. A ring-shaped spacer (not shown) having an outer diameter of 20 μm was interposed between the substrates 11 and 17, providing a closed space. This space was filled with the light-scattering medium, thus forming a layer 27 of light-scattering medium. The resultant structure was heated at 50° C. for 20 minutes, heated to 90° C. and maintained at 90° C. for 5 minutes. A polymer-dispersed type TFT-LCD panel was made which had the structure of FIG. 32.

The polymer-dispersed type TFT-LCD panel was tested. More specifically, a voltage of 20 V was applied between the transparent electrode 15 and pixel electrodes 23. The panel produced high-luminance colors. The panel was found to utilize 25% of external light to produce various colors.

EXAMPLE 15

A phase-change type TFT-LCD panel having the structure shown in FIG. 36 was manufactured in the following way.

Figure 36:
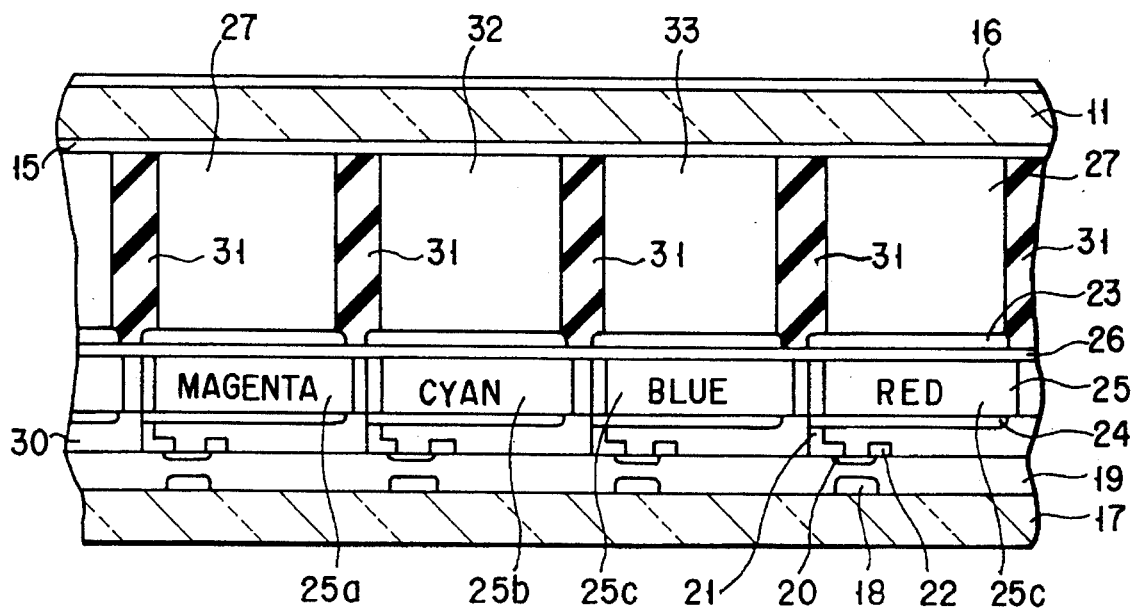
FIG. 36 is a sectional view showing a part of a further TFT-LCD panel according to the fourth aspect of this invention.

First, TFT switching elements were mounted on a transparent substrate 17, thereby to form pixels on this transparent substrate as shown in FIG. 36. To state more precisely, an insulating film 30 was formed on the substrate 17. An aluminum film, 1000 angstroms thick, was vapor-deposited on the insulating film 30, thereby forming light-scattering films 24. Next, a color filter layer 25 was formed by printing technique. The layer 25 was patterned into color filter regions arranged as shown in FIG. 8, each having a size of 40×40 μm.

Thereafter, acrylate was coated on the color filter layer 25 and cured, forming a protective film 26 having a thickness of 1500 angstroms. Resist was then coated on the protective film 26, forming a resist layer. Holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26. Each hole reached the source electrodes 21 of the TFTs and flared toward to the top. ITO was vapor-deposited on the protective film 26, forming an ITO layer. The ITO layer was patterned, thereby forming pixel electrodes 23 having a thickness of 1000 angstroms. The pixel electrodes 23 were electrically connected to the source electrodes 21 of the TFTs. Resist having black pigment dispersed in it was applied, forming walls 31 which were 10 μm high and which were to surround pixels.

Next, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Cholesteric liquid crystal (d/p=3) containing yellow dye was filled in a third-pixel space 32 and a fourth-pixel space 33, whereas cholesteric liquid crystal containing no dyes was filled in the other pixel spaces 27. As a result, a phase-change type TFT-LCD panel was manufactured.

The phase-change type TFT-LCD panel, thus made, was tested. To state more specifically, a voltage of 40 V was applied between the transparent electrode 15 and pixel electrodes 23. The panel produced high-luminance colors. The panel was found to utilize 25% of external light to produce various colors.

EXAMPLE 16

Another phase-change type TFT-LCD panel having the structure shown in FIG. 36 was manufactured in the following method.

First, TFT switching elements were mounted on a transparent substrate 17, thereby to form pixels shown on this transparent substrate as illustrated in FIG. 36. More precisely, an insulating film 30 was formed on the substrate 17. An aluminum film, 1000 angstroms thick, was vapor-deposited on the insulating film 30, forming light-scattering films 24. Further, a color filter layer 25 was formed by printing technique. The layer 25 was patterned into color filter regions arranged as shown in FIG. 9 and each having a size of 40×40 μm.

Then, urethane acrylate was coated on the color filter layer 25 and cured, forming a protective film 26 having a thickness of 1500 angstroms. Resist was coated on the protective film 26, thus forming a resist layer. Circular holes having a diameter of 2 μm were made in the resist layer. Using the resist layer as an etching mask, RIE was performed on the protective film 26, the color filter layer 25 and the light-scattering films 24. Vertical holes were thereby formed in the films 24, layer 25 and the film 26. Each hole reached the source electrodes 21 of the TFTs and flared toward the top. ITO was then vapor-deposited on the protective film 26, forming an ITO layer. The ITO layer was patterned, thus forming pixel electrodes 23 having a thickness of 1000 angstroms. The pixel electrodes 23 were electrically connected to the source electrodes 21 of the TFTs. Resist having black pigment dispersed in it was applied, forming walls 31 which were 10 μm high and which were to surround pixels.

Thereafter, ITO was vapor-deposited on the other transparent substrate 11, forming a transparent electrode 15 having a thickness of 1000 angstroms. Next, the first and second substrates 11 and 17 were positioned parallel to each other and spaced apart from each other—with the transparent electrode 15 opposing the pixel electrodes 23. Smectic A liquid crystal containing yellow dye was filled in a third-pixel space 32 and a fourth-pixel space 33, whereas smectic A liquid crystal containing no dyes was filled in the other pixel spaces. Further, a heating electrode (not shown) was on the entire surface of the transparent substrate 11. As a result, a phase-change type TFT-LCD panel was manufactured.

The phase-change type TFT-LCD panel, thus made, was tested. To state more specifically, a voltage of 15 V was applied between the transparent electrode 15 and pixel electrodes 23, while heating the pixels. The panel produced high-luminance colors. The panel was found to utilize 25% of external light to produce various colors.

EXAMPLES 17 to 30

Examples 17 to 30, which will be described below, are TFT-LC panels which pertain to the fifth to seventh aspects of this invention. Each of these examples incorporates color filters which oppose the color filter provided on the first transparent substrate. The color filters may be replaced by black filters or filters of other colors, which absorb the light passing through the first transparent substrate.

EXAMPLE 17

A polymer-dispersed type TFT-LCD panel was manufactured in the following way.

First, TFT switching elements were mounted on a transparent substrate (the second substrate). Then, an insulating film was formed on the transparent substrate, covering the TFT switching elements. A titanium oxide layer, 2 μm thick, was formed on the insulating film. A layer of resist having a dye dispersed in it, 2 μm thick, was formed on the titanium oxide layer and patterned, forming the color filters shown in FIG. 12, each having a size of 100×100 μm. A protective film having a thickness of 2 μm was formed on the color filters. Next, a surface of the protective film is pressed to form a prism-like surface. Aluminum columns were then formed, which were electrically connected to the source electrodes of the TFT switching elements.

Then, two ITO films were formed, each on surface of a transparent substrate having a thickness of 0.1 mm. The ITO films had a size of 100×100 μm and a thickness of 1000 angstroms. This transparent substrate was laid on the above-mentioned transparent substrate (the second substrate), with the ITO films electrically connected to the aluminum columns.

Next, a color filter layer, 2 μm thick, was formed on the other transparent substrate (the first substrate) and so located as to oppose a prescribed pixel. Black-colored films having a thickness of 2 μm were formed on the first substrate, defining the boundaries of pixels. Further, ITO was vapor-deposited on the first substrate, forming a transparent electrode which had a thickness of 1000 angstroms and which covered the color filter layer and the black-colored protective film 14. A reflection-preventing film, which had a thickness of 2 μm and low refractive index, was formed on that surface of the first substrate which faces away from the transparent electrode 15.

Further, two epoxy resins, Devcon 5A and Epon 812, used as matrices, and Capcure 3-800, used as curing agent, were mixed in ratio of 1:1:2, thereby preparing a composition. This composition and liquid crystal E-7 containing 1% of S-811 (trade name, manufactured by Merk) were mixed together, in ratio of 1:2, preparing a light-scattering medium.

Thereafter, the first and second substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium. The resultant structure was heated at 50° C. for 20 minutes, heated to 90° C. and maintained at 90° C. for 5 minutes. A polymer-dispersed type TFT-LCD panel was thereby manufactured.

The polymer-dispersed type TFT-LCD panel was tested. More specifically, a voltage was applied between the opposing electrodes. The panel produced high-luminance colors in the color-producing region illustrated in FIG. 37. The contrast of the image formed was 4.7:1. Similar results were obtained when a black filter was provided, in addition to the blue filter, on that part of the second substrate which opposed the color filter layer formed on the first substrate.

EXAMPLE 18

Figure 39:
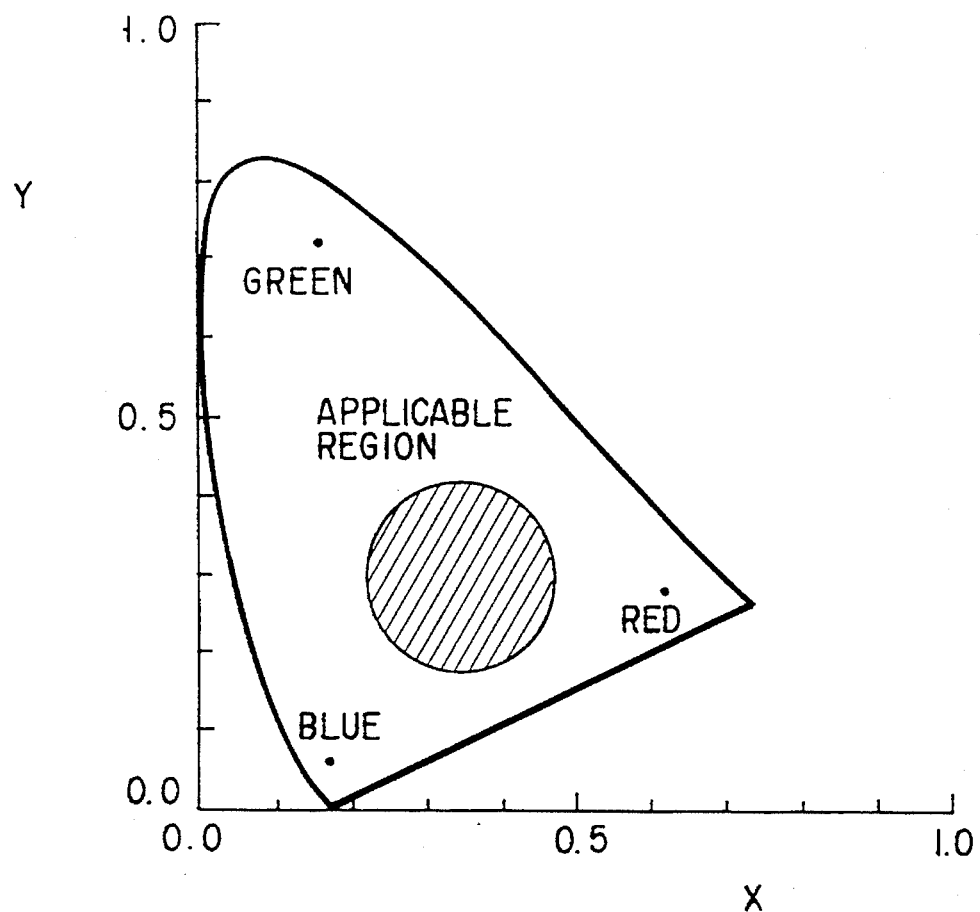

A polymer-dispersed type TFT-LCD panel was manufactured in the same method as in Example 17, except that color filters were arranged as shown in FIG. 32. The TFT-LCD panel was put to the test, wherein a voltage was applied between the opposing electrodes. Then, the panel produced high-luminance colors in the color-producing region illustrated in FIG. 39. The contrast of the image obtained was 8:1. Similar results were achieved when a red filter, a blue filter and a black filter were provided, besides the magenta filter, on that part of the second substrate which opposed the color filter layer formed on the first substrate.

EXAMPLE 19

Another polymer-dispersed type TFT-LCD panel was made in the manner as in Example 17, except that color filters were arranged as shown in FIG. 40. The TFT-LCD panel was put to the test, wherein a voltage was applied between the opposing electrodes. Then, the panel produced high-luminance colors in the color-producing region shown in FIG. 41. The contrast of the formed was 3.2:1. Similar results were achieved when a black filter was provided, along with the blue filter, on that part of the second substrate which opposed the color filter layer formed on the first substrate.

EXAMPLE 20

Figure 43:
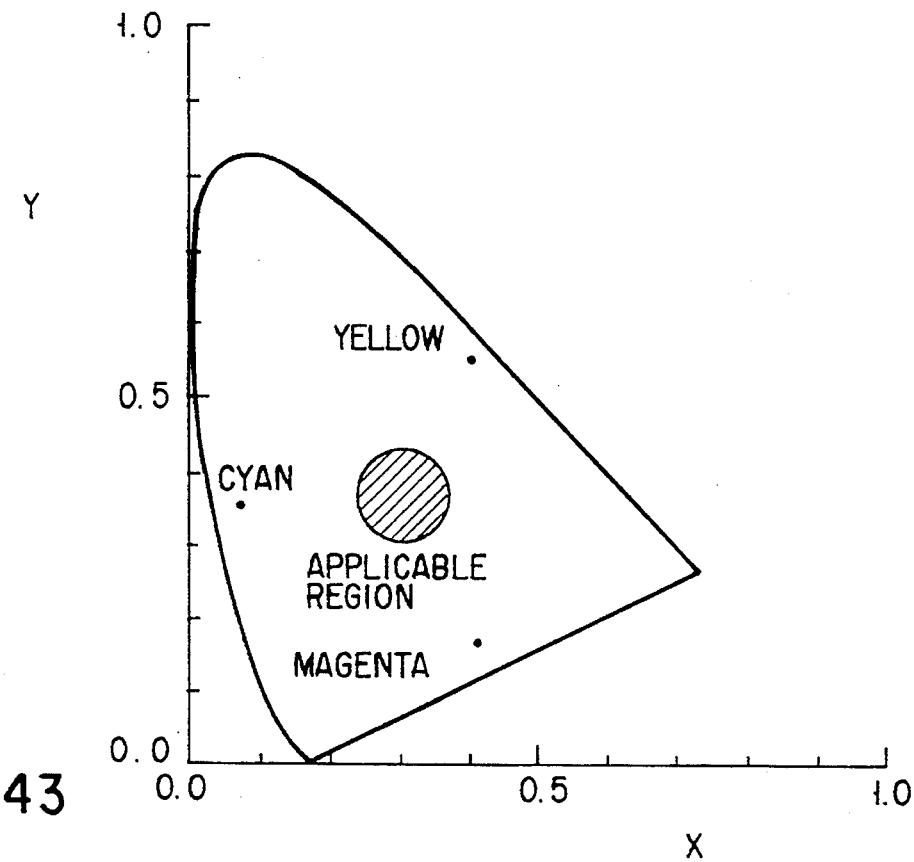

A polymer-dispersed type TFT-LCD panel was made in the same method as in Example 17, except that color filters were arranged as shown in FIG. 42. The TFT-LCD panel was put to the test, wherein a voltage was applied between the opposing electrodes. Then, the panel produced high-luminance colors in the color-producing region illustrated in FIG. 43. The contrast of the image obtained was 6:1. Similar results were attained when two black filters were provided, besides the blue and red filters, on that part of the second substrate which opposed the color filter layer formed on the first substrate.

EXAMPLE 21

Figure 44:
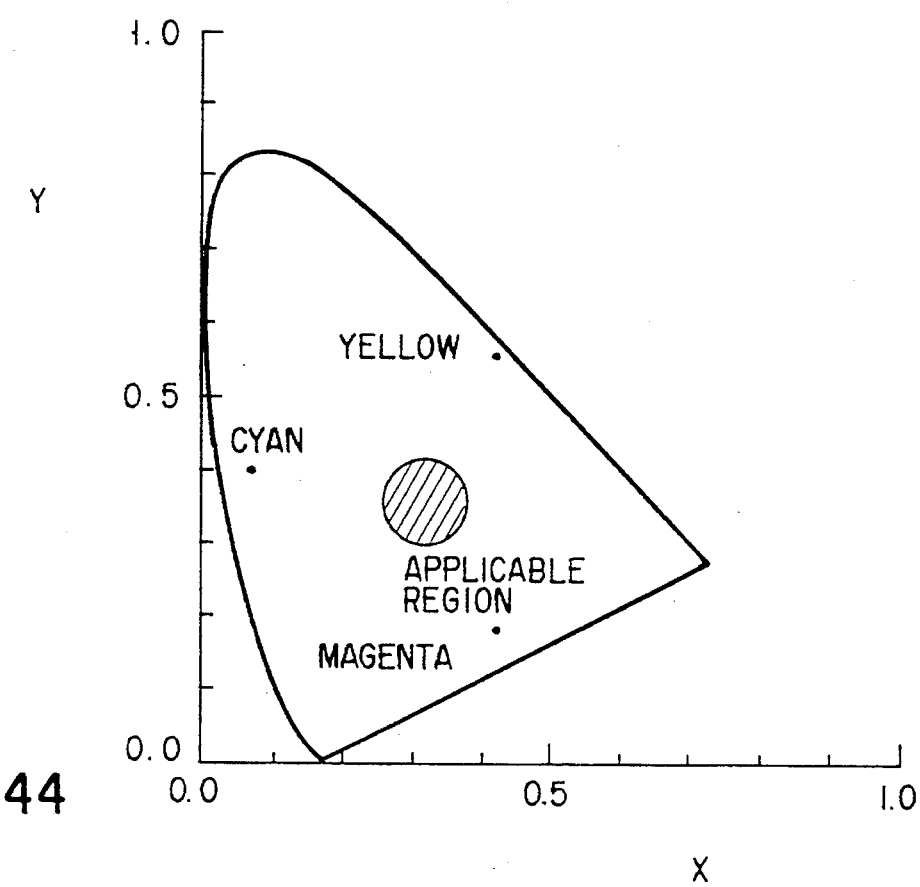

Still another polymer-dispersed type TFT-LCD panel was manufactured in the same way as in Example 17, except that color filters were arranged as shown in FIG. 1. The TFT-LCD panel was put to the test, wherein a voltage was applied between the opposing electrodes. Then, the panel produced high-luminance colors in the color-producing region illustrated in FIG. 44. The contrast of the image obtained was 4.2:1. Similar results were achieved when a red filter, a black filter was provided, in addition to the blue filter, on that part of the second substrate which opposed the color filter layer formed on the first substrate.

EXAMPLE 22

Figure 45:
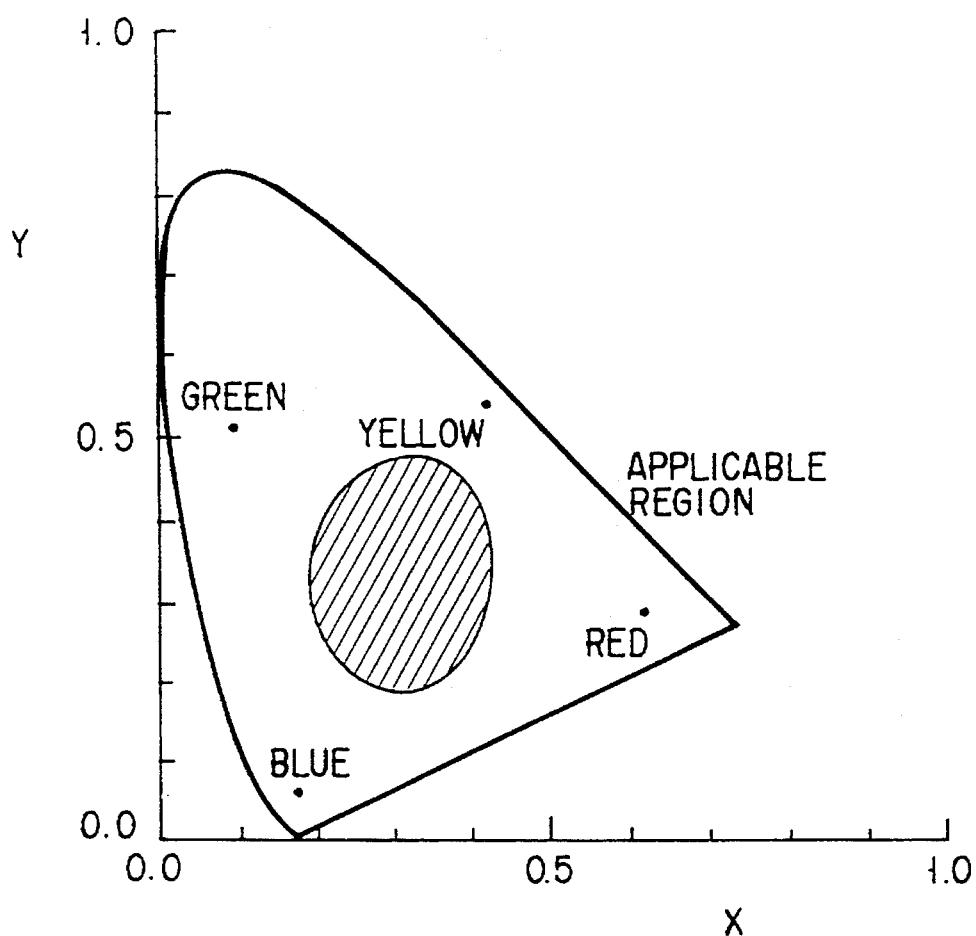

A polymer-dispersed type TFT-LCD panel was manufactured in the same method as in Example 17, except that color filters were arranged as shown in FIG. 27. The TFT-LCD panel was put to the test, wherein a voltage was applied between the opposing electrodes. Then, the panel produced high-luminance colors in the color-producing region illustrated in FIG. 45. The contrast of an image formed was 8:1. Similar results were obtained when a black filter was arranged besides the blue filter and/or a red filter, a blue filter, and a black filter were arranged besides the magneta filter, on those parts of the second substrate which opposed the color filter layers formed on the first substrate.

EXAMPLE 23

Figure 46:
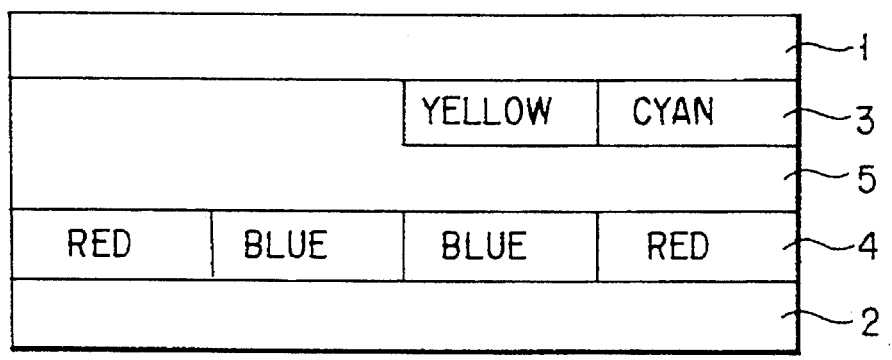

A polymer-dispersed type TFT-LCD panel was made in the same method as in Example 17, except that color filters were arranged as shown in FIG. 46. The TFT-LCD panel was put to the test, wherein a voltage was applied between the opposing electrodes. Then, the panel produced high-luminance colors in the color-producing region illustrated in FIG. 47. The contrast of an image formed was 8.1:1. Similar results were achieved when two black filters were provided, besides the blue filter and the red filter, on those parts of the second substrate which opposed the color filter layers formed on the first substrate.

EXAMPLE 24

Another polymer-dispersed type TFT-LCD panel was made in the same method as in Example 17, except that color filters were arranged as shown in FIG. 31. The TFT-LCD panel was put to the test, wherein a voltage was applied between the opposing electrodes. Then, the panel produced high-luminance colors in the color-producing region illustrated in FIG. 48. The contrast of an image formed was 5:1. Similar results were achieved when two black filters were provided, besides the blue filter and the red filter, on those parts of the second substrate which opposed the color filter layers formed on the first substrate.

EXAMPLE 25

Figure 49:
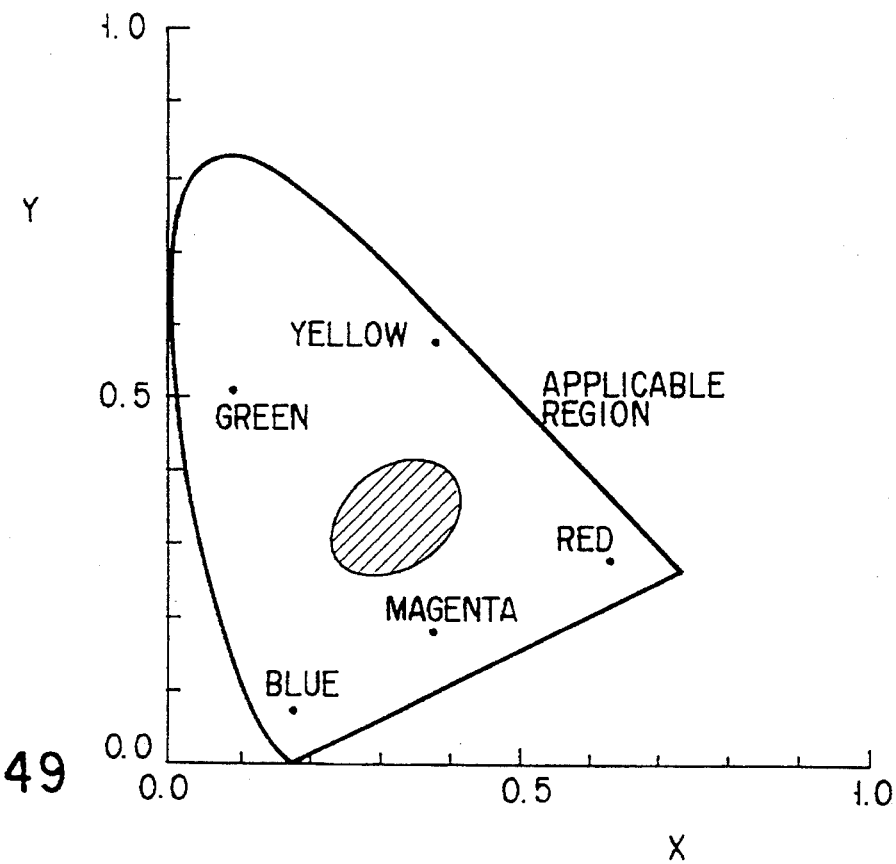

A polymer-dispersed type TFT-LCD panel was made in the same method as in Example 17, except that color filters were arranged as shown in FIG. 29. The TFT-LCD panel was put to the test, wherein a voltage was applied between the opposing electrodes. Then, the panel produced high-luminance colors in the color-producing region illustrated in FIG. 49. The contrast of an image formed was 6.2:1. Similar results were achieved when a black filter was arranged besides the blue filter, and/or a red filter, a blue filter and the black filter were arranged besides magenta filter, on those parts of the second substrate which opposed the color filter layers formed on the first substrate.

EXAMPLE 26

Figure 50:
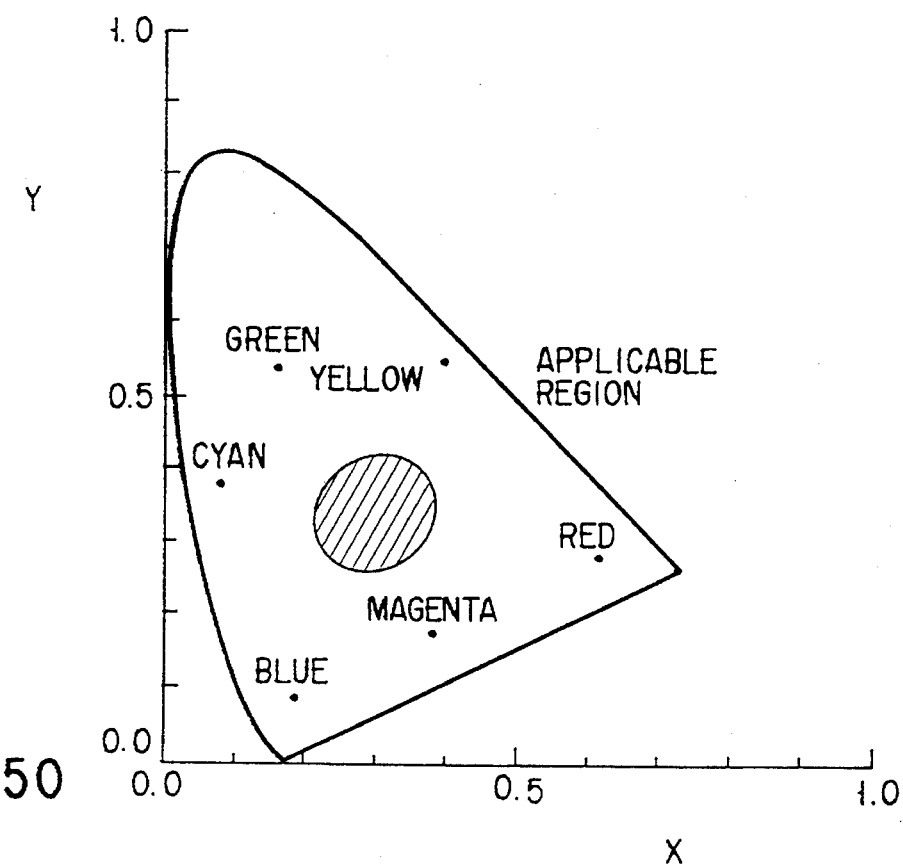

Another polymer-dispersed type TFT-LCD panel was made in the same method as in Example 17, except that color filters were arranged as shown in FIG. 33. The TFT-LCD panel was put to the test, wherein a voltage was applied between the opposing electrodes. Then, the panel produced high-luminance colors in the color-producing region illustrated in FIG. 50. The contrast of an image formed was 5.5:1. Similar results were achieved when three black filters were arranged, besides the blue, red and green filters, on those parts of the second substrate which opposed the color filter layers formed on the first substrate.

EXAMPLE 27

A polymer-dispersed type TFT-LCD panel was manufactured in the following way.

First, TFT switching elements were mounted on one transparent substrate. An insulating film 30 was formed on the first substrate, covering the TFT switching elements. An aluminum film, 1000 angstroms thick, was vapor-deposited on the insulating film 30, thereby forming light-scattering films. Next, a color filter layer made of resist having a dye dispersed in it was formed and patterned, thereby forming color regions arranged as shown in FIG. 13. A protective film, 1500 angstroms thick, was formed on the color regions. ITO was then vapor-deposited on the protective film, forming an ITO film having a thickness of 1000 angstroms. The ITO film was patterned, thus forming pixel electrodes, which were electrically connected by the light-scattering films to the source electrodes of the TFT switching elements.

Then, ITO was vapor-deposited on the other transparent substrate 11, forming a transparent electrode having a thickness of 1000 angstroms. The transparent electrode, thus formed, was patterned in the same way as indicated above. A reflection-preventing film, which had a thickness of 2 μm and low refractive index, was formed on that surface of the first substrate which faces away from the first-mentioned transparent electrode.

Next, 100 parts by weight of Epon 812 used as matrix, 100 parts by weight of Capcure 3-800 used as curing agent, and 200 parts by weight of liquid crystal E-7 were mixed, thereby preparing a light-scattering medium.

The two transparent substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium, thereby forming a layer of light-scattering medium. The resultant structure was heated at 60° C. for 30 minutes, heated to 100° C. and maintained at 100° C. for 10 minutes. Further, a yellow filter was bonded to that part of the other substrate which opposed the third pixel. A polymer-dispersed type TFT-LCD panel was manufactured.

The polymer-dispersed type TFT-LCD panel was tested. To be more precise, a voltage of 15 V was applied between the transparent electrode and pixel electrodes. The panel produced high-luminance colors. The panel was found to utilize 27% of external light to produce various colors.

EXAMPLE 28

A polymer-dispersed type TFT-LCD panel was manufactured in the following way.

First, TFT switching elements were mounted on one transparent substrate. Then, pixels were formed on the TFT switching elements and arranged as illustrated in FIG. 31. More precisely, an insulating film was formed on the transparent substrate, covering the TFT switching elements, and pixel electrodes made of aluminum were formed in the same way as in the examples described above. A layer of resist having a dye dispersed in it, 2 μm thick, was formed and patterned, forming the color filters shown in FIG. 38, each having a size of 100×100 μm. A protective film having a thickness of 1500 angstroms was formed on the color filters. Next, ITO was vapor-deposited on the protective film, forming an ITO film having a thickness of 1000 angstroms and electrically connected to the pixel electrodes made of aluminum.

Next, a green filter layer, 2 μm thick, was formed on the other transparent substrate, patterned and so located as to oppose the third pixel. Black-colored films having a thickness of 2 μm were formed on the transparent substrate, defining the boundaries of pixels. Further, a protective film was formed on the substrate. ITO was vapor-deposited on the protective film, forming a transparent electrode having a thickness of 1000 angstroms. A reflection-preventing film, which had a thickness of 2 μm and low refractive index, was formed on that surface of the substrate which faces away from the transparent electrode.

Further, two epoxy resins, Devcon 5A and Epon 812, used as matrices, and Capcure 3-800, used as curing agent, were mixed in ratio of 1:1:2, thereby preparing a light-scattering medium.

Thereafter, the two transparent substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium. The resultant structure was heated at 50° C. for 20 minutes, heated to 90° C. and maintained at 90° C. for 5 minutes. A polymer-dispersed type TFT-LCD panel was thereby manufactured.

The polymer-dispersed type TFT-LCD panel was put to the test, in which a voltage of 20 V was applied between the opposing electrodes. The panel produced high-luminance colors. The panel was found to utilize 37% of external light to produce various colors.

EXAMPLE 29

A phase-change type TFT-LCD panel having the structure shown in FIG. 35 was manufactured in the following method.

First, TFT switching elements were mounted on one transparent substrate, thereby to form pixels on this transparent substrate as shown in FIG. 35. To be more specific, color filters, each having a size of 40×40 μm were formed by printing technique and arranged on the transparent substrate as shown in FIG. 27. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes.

Cholesteric liquid crystal (d/p=3) containing dichroic yellow dye was filled in a third-pixel space, and cholesteric liquid crystal (d/p=3) containing dichroic green dye was filled in a fourth-pixel space, whereas cholesteric liquid crystal containing no dyes was filled in the other pixel spaces. As a result, a phase-change type TFT-LCD panel was manufactured.

The phase-change type TFT-LCD panel, thus made, was tested. That is, a voltage of 40 V was applied between the transparent electrode and pixel electrodes. The panel produced high-luminance colors. The panel was found to utilize 33% of external light to produce various colors.

EXAMPLE 30

A phase-change type TFT-LCD panel was manufactured in the following method.

First, TFT switching elements were mounted on one transparent substrate, thereby to form pixels on this transparent substrate as illustrated in FIG. 35. To be more specific, color filters, each having a size of 100×100 μm were formed by printing technique and arranged on the transparent substrate as shown in FIG. 46. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes. Smectic liquid crystal containing dichroic yellow dye was filled in a third-pixel space, and cholesteric liquid crystal containing dichroic cyan dye was filled in a fourth-pixel space, whereas smectic liquid crystal containing no dyes was filled in the other pixel spaces. Heating electrodes were formed on both transparent substrates. As a result, a phase-change type TFT-LCD panel was manufactured.

The phase-change type TFT-LCD panel, thus made, was tested. That is, a voltage of 15 V was applied between the transparent electrode and pixel electrodes. The panel produced high-luminance colors. The panel was found to utilize 27% of external light to produce various colors.

EXAMPLES 31 to 34

Examples 31 to 34, which will be described below, are TFT-LCD panels according to the eighth aspect of the present invention.

EXAMPLE 31

A polymer-dispersed type TFT-LCD panel was made in the following method.

First, TFT switching elements were mounted on one transparent substrate having pits in its surface. An aluminum film, 1000 angstroms thick, was vapor-deposited on the transparent substrate, covering the TFT switching elements. Then, a color filter layer made of dye-dispersed resist and having a thickness of 2 μm was formed on the aluminum film and patterned, thereby forming color filters arranged as shown in FIG. 24. The green filter was adjusted to exhibit maximum transmittance to 530 nm light and 30%-transmittance to 545 nm light. The aluminum film had pits, too, which opposed the pits formed in the transparent substrate.

A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes.

Next, ITO was vapor-deposited on the other transparent substrate, forming a transparent electrode having a thickness of 1000 angstroms.

Thereafter, 100 parts by weight of Epon 812 used as matrix, 100 parts by weight of Capcure 3-800 used as curing agent, and 200 parts by weight of liquid crystal E-7 were mixed, thereby preparing a light-scattering medium.

The two transparent substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium. The resultant structure was heated at 60° C. for 30 minutes, heated to 100° C. and maintained at 100° C. for 10 minutes. The color filters opposed the pixel electrodes. A yellow filter was bonded to that part of the other substrate which opposed the third pixel. The yellow filter was one which exhibits 85%-transmittance to light having a wavelength of 545 nm. A polymer-dispersed type TFT-LCD panel was manufactured.

The polymer-dispersed type TFT-LCD panel was tested. To be more precise, a voltage of 15 V was applied between the transparent electrode and pixel electrodes. The panel produced high-luminance colors, in image contrast of 3.5:1. The panel was found to utilize 30% of external light to produce various colors.

EXAMPLE 32

A polymer-dispersed type TFT-LCD panel was made in the following way.

First, TFT switching elements were mounted on one transparent substrate, thereby to form the pixels on the transparent substrate as shown in FIG. 31. An aluminum film was formed and patterned, thus forming pixel electrodes. Then, a film of acrylic resin containing titanium oxide grains was formed on the entire surface of the transparent substrate to a thickness of 5000 angstroms. Using dye-dispersed resist, a color filter layer shown in FIG. 12 was patterned, forming color filters each having a size of 50×50 μm. Of these color filters, the green filter was adjusted to exhibit maximum transmittance to 525 nm light and 20%-transmittance to 545 nm light.

A protective film having a thickness of 1500 angstroms was formed on the color filters. Next, ITO was vapor-deposited on the protective film, forming an ITO layer having a thickness of 1000 angstroms and electrically connected to the pixel electrodes made of aluminum.

Further, a yellow-colored layer, 2 μm thick, was formed on the other substrate and patterned, so as to oppose the third pixel. Black-colored films having a thickness of 2 μm were formed on the transparent substrate, defining the boundaries of pixels. Further, a protective film was formed on the substrate. ITO was vapor-deposited on the protective film, forming a transparent electrode having a thickness of 1000 angstroms. The transparent electrode was patterned in the same way as described above. At this time, the transmittance to 545 nm light of the yellow-colored layer was adjusted to 80%. A reflection-preventing film, which had a thickness of 2 μm and low refractive index, was formed on that surface of the substrate which faces away from the transparent electrode.

Next, two epoxy resins, Devcon 5A and Epon 812, used as matrices, and Capcure 3-800, used as curing agent, were mixed in ratio of 1:1:2, thereby preparing a light-scattering medium.

Thereafter, the two transparent substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium. The resultant structure was heated at 50° C. for 20 minutes, heated to 90° C. and maintained at 90° C. for 5 minutes. A polymer-dispersed type TFT-LCD panel was thereby manufactured.

The polymer-dispersed type TFT-LCD panel was put to the test, in which a voltage of 15 V was applied between the opposing electrodes. The panel produced high-luminance colors, in image contrast of 3.5:1. The panel was found to utilize 30% of external light to produce various colors.

EXAMPLE 33

A phase-change type TFT-LCD panel was made in the following method.

First, TFT switching elements were mounted on one transparent substrate, thereby to form pixels on this transparent substrate as illustrated in FIG. 35. Color filters shown in FIG. 12, each containing a light-scattering pigment and having a size of 40×40 μm, were formed by printing technique on the transparent substrate. Of these color filters, the green filter was adjusted to exhibit maximum transmittance to 151 nm light and 5%-transmittance to 545 nm light. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes. Cholesteric liquid crystal (d/p=3) containing yellow dye was filled in a third-pixel space, whereas cholesteric liquid crystal containing no dyes was filled in the other pixel spaces. The yellow dye was adjusted to exhibit a 80% transmittance to 545 nm light. As a result, a phase-change type TFT-LCD panel was manufactured.

The phase-change type TFT-LCD panel, thus made, was tested. That is, a voltage of 40 V was applied between the transparent electrode and pixel electrodes. The panel produced high-luminance colors, in image contrast of 4:1. The yellow dye was adjusted to exhibit a 90% transmittance to 545 nm light. The panel was found to utilize 30% of external light to produce various colors.

EXAMPLE 34

Another phase-change type TFT-LCD panel was manufactured in the following method.

First, TFT switching elements were mounted on one transparent substrate, thereby to form pixels on this transparent substrate as illustrated in FIG. 35. Color filters shown in FIG. 12 were formed. Two resist layers were then formed, one containing titanium oxide grains and the other not containing titanium oxide grains. The resist layers were patterned, forming color layers each having a size of 40×40 µm. Of these color layers, the green layer was adjusted to exhibit maximum transmittance to 530 nm light and 30%-transmittance to 545 nm light. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 µm high and which were to surround pixels.

Next, ITO was vapor-deposited on the other transparent substrate, forming a transparent electrode having a thickness of 1000 angstroms. The two substrates and were positioned parallel to each other and spaced apart from each other— with the transparent electrode opposing the pixel electrodes. Smectic liquid crystal containing yellow dye was filled in a third-pixel space, whereas smectic liquid crystal containing no dyes was filled in the other pixel spaces. The yellow dye was adjusted to exhibit a 90% transmittance to 545 nm light. Heating electrodes were formed on both transparent substrates. As a result, a phase-change type TFT-LCD panel was manufactured.

The phase-change type TFT-LCD panel, thus made, was tested. That is, a voltage of 15 V was applied between the transparent electrode and pixel electrodes. The panel produced high-luminance colors in image contrast of 4.5:1. The panel was found to utilize 30% of external light to produce various colors.

EXAMPLES 35 to 38

Examples 35 to 38, which will be described below, are TFT-LCD panels according to the ninth aspect of this invention.

EXAMPLE 35

A polymer-dispersed type TFT-LCD panel was manufactured in the following way.

First, TFT switching elements were mounted on one transparent substrate. An aluminum film, 1000 angstroms thick, was vapor-deposited on the transparent substrate. A color filter layer made of dye-dispersed resist and having a thickness of 2 µm was formed and patterned, thereby to form the pixels arranged as shown in FIG. 24. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes.

Next, ITO was vapor-deposited on the other transparent substrate, forming a transparent electrode having a thickness of 1000 angstroms. The transparent electrode was patterned, forming regions which corresponded to the pixels.

Thereafter, 100 parts by weight of Epon 812 used as matrix, 100 parts by weight of Capcure 3-800 used as curing agent, and 200 parts by weight of liquid crystal E-7 were mixed, thereby preparing a light-scattering medium.

The two transparent substrates were positioned parallel to each other and spaced apart from each other—with the transparent electrode opposing the pixel electrodes. A ring-shaped spacer (not shown) having an outer diameter of 20 µm was interposed between the substrates, providing a closed space. This space was filled with the light-scattering medium. The resultant structure was heated at 60° C. for 30 minutes, heated to 100° C. and maintained at 100° C. for 10 minutes. The color filters opposed the pixel electrodes. A yellow filter was bonded to that part of the other substrate which opposed the third pixel. Further, a green filter was bonded to that part of the other substrate which opposed the fourth pixel. A polymer-dispersed type TFT-LCD panel was manufactured.

The polymer-dispersed type TFT-LCD panel was tested. To be more precise, a voltage of 15 V was applied between the transparent electrode and pixel electrodes. The panel produced high-luminance colors. The panel was found to utilize 27% of external light to produce various colors.

EXAMPLE 36

A polymer-dispersed type TFT-LCD panel was manufactured in the following way.

First, TFT switching elements were mounted on one transparent substrate, thereby to form the pixels on the transparent substrate as shown in FIG. 31. An aluminum film was formed and patterned, thus forming pixel electrodes. Then, a film of acrylic resin containing titanium oxide grains was formed on the entire surface of the transparent substrate to a thickness of 5000 angstroms. Using dye-dispersed resist, a color filter layer shown in FIG. 24 was patterned, forming color filters each having a size of 50×50 µm.

A protective film having a thickness of 1500 angstroms was formed on the color filters. Next, ITO was vapor-deposited on the protective film, forming an ITO layer having a thickness of 1000 angstroms and electrically connected to the pixel electrodes made of aluminum.

Further, a yellow-colored layer, 2 µm thick, was formed on the other substrate and patterned, so as to oppose the third pixel. A green-colored layer, 2 µm thick, was formed on the other substrate and patterned, so as to oppose the fourth pixel. Black-colored films having a thickness of 2 µm were formed on the transparent substrate, defining the boundaries of pixels. Further, a protective film was formed on the substrate. ITO was vapor-deposited on the protective film, forming a transparent electrode having a thickness of 1000 angstroms. The transparent electrode was patterned in the same way as described above. A reflection-preventing film, which had a thickness of 2 µm and low refractive index, was formed on that surface of the substrate which faces away from the transparent electrode.

Next, two epoxy resins, Devcon 5A and Epon 812, used as matrices, and Capcure 3-800, used as curing agent, were mixed in ratio of 1:1:2, thereby preparing a light-scattering medium.

Thereafter, the two transparent substrates were positioned parallel to each other and spaced apart from each other— with the transparent electrode opposing the pixel electrodes. A ring-shaped spacer (not shown) having an outer diameter of 20 µm was interposed between the substrates, providing a closed space. This space was filled with the light-scattering medium. The resultant structure was heated at 50° C. for 20 minutes, heated to 90° C. and maintained at 90° C. for 5 minutes. A polymer-dispersed type TFT-LCD panel was thereby manufactured.

The polymer-dispersed type TFT-LCD panel was put to the test, in which a voltage of 15 V was applied between the opposing electrodes. The panel produced high-luminance colors. The panel was found to utilize 35% of external light to produce various colors.

EXAMPLE 37

A phase-change type TFT-LCD panel was made in the following method.

First, TFT switching elements were mounted on one transparent substrate, thereby to form pixels on this transparent substrate as illustrated in FIG. 35. Color filters shown in FIG. 24, each containing a light-scattering pigment and having a size of 40×40 μm, were formed by printing technique on the transparent substrate. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes. Cholesteric liquid crystal (d/p=3) containing dichroic yellow dye was filled in a third-pixel space and cholesteric liquid crystal (d/p=3) containing dichroic green dye was filled in a fourth-pixel space, whereas cholesteric liquid crystal containing no dyes was filled in the other pixel spaces. As a result, a phase-change type TFT-LCD panel was manufactured.

The phase-change type TFT-LCD panel, thus made, was tested. That is, a voltage of 40 V was applied between the transparent electrode and pixel electrodes. The panel produced high-luminance colors. The panel was found to utilize 25% of external light to produce various colors.

EXAMPLE 38

A phase-change type TFT-LCD panel was made in the following method.

First, TFT switching elements were mounted on one transparent substrate, thereby to form pixels on this transparent substrate as illustrated in FIG. 35. Color filters shown in FIG. 24, each containing a light-scattering pigment and having a size of 40×40 μm, were formed by printing technique on the transparent substrate. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes. Smectic A liquid crystal containing dichroic yellow dye was filled in a fourth-pixel space and smectic A liquid crystal containing dichroic green dye was filled in a fifth-pixel space, whereas smectic liquid crystal containing no dyes was filled in the other pixel spaces. Heating electrodes were formed on both transparent substrates. As a result, a phase-change type TFT-LCD panel was manufactured.

The phase-change type TFT-LCD panel, thus made, was tested. That is, a voltage of 15 V was applied between the transparent electrode and pixel electrodes. The panel produced high-luminance colors. The panel was found to utilize 35% of external light to produce various colors.

EXAMPLES 39 to 42

Examples 39 to 42, which will be described below, are TFT-LCD panels according to the tenth aspect of this invention.

EXAMPLE 39

A polymer-dispersed type TFT-LCD panel was manufactured in the following way.

First, TFT switching elements were mounted on one transparent substrate. An aluminum film, 1000 angstroms thick, was formed and patterned, thus forming pixel electrodes. Using dye-dispersed resist, a color filter layer having a thickness of 2 μm was patterned, forming color filters arranged as shown in FIG. 26.

A protective film having a thickness of 1500 angstroms was formed on the color filters. Next, ITO was vapor-deposited on the protective film, forming a transparent electrode. The transparent electrode was patterned, forming pixel electrodes.

Next, ITO was vapor-deposited on the other transparent substrate, forming a transparent electrode having a thickness of 1000 angstroms. The transparent electrode was patterned, forming regions which corresponded to the pixels.

Thereafter, 100 parts by weight of Epon 812 used as matrix, 100 parts by weight of Capcure 3-800 used as curing agent, and 200 parts by weight of liquid crystal E-7 were mixed, thereby preparing a light-scattering medium.

The two transparent substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium. The resultant structure was heated at 60° C. for 30 minutes, heated to 100° C. and maintained at 100° C. for 10 minutes. The color filters arranged, opposing the pixel electrodes. The color filters were bonded to the substrate (the second substrate) and opposed the pixel electrodes. A cyan filter was bonded to that part of the other substrate (the first substrate) which opposed the fourth pixel. Further, yellow filter was bonded to that part of the other substrate which opposed fifth pixel. A polymer-dispersed type TFT-LCD panel was manufactured.

The polymer-dispersed type TFT-LCD panel was tested. To be more precise, a voltage of 15 V was applied between the transparent electrode and pixel electrodes. The panel produced high-luminance colors. The panel was found to utilize 35% of external light to produce various colors.

EXAMPLE 40

A polymer-dispersed type TFT-LCD panel was manufactured in the following way.

First, TFT switching elements were mounted on one transparent substrate, thereby to form the pixels on the transparent substrate as shown in FIG. 31. An aluminum film was formed and patterned, thus forming pixel electrodes. Then, a film of acrylic resin containing titanium oxide grains was formed on the entire surface of the transparent substrate to a thickness of 5000 angstroms. Using dye-dispersed resist, a color filter layer shown in FIG. 26 was patterned, forming color filters each having a size of 50×50 μm.

A protective film having a thickness of 1500 angstroms was formed on the color filters. Next, ITO was vapor-deposited on the protective film, forming an ITO layer having a thickness of 1000 angstroms and electrically connected to the pixel electrodes made of aluminum.

Further, a yellow-colored layer, 2 μm thick, was formed on the other substrate and patterned, so as to oppose the third pixel. A cyan-colored layer, 2 μm thick, was formed on the other substrate and patterned, so that it opposed the fourth pixel. A yellow-colored layer, 2 μm thick, was formed on the other substrate and patterned, so as to oppose the fifth pixel. Black-colored films having a thickness of 2 μm were formed on the transparent substrate, defining the boundaries of pixels. Further, a protective film was formed on the substrate. ITO was vapor-deposited on the protective film, forming a transparent electrode having a thickness of 1000 angstroms. The transparent electrode was patterned in the same way as described above. A reflection-preventing film, which had a thickness of 2 μm and low refractive index, was formed on that surface of the substrate which faces away from the transparent electrode.

Next, two epoxy resins, Devcon 5A and Epon 812, used as matrices, and Capcure 3-800, used as curing agent, were mixed in ratio of 1:1:2, thereby preparing a light-scattering medium.

Thereafter, the two transparent substrates were positioned parallel to each other and spaced apart from each other—with the transparent electrode opposing the pixel electrodes. A ring-shaped spacer (not shown) having an outer diameter of 20 μm was interposed between the substrates, providing a closed space. This space was filled with the light-scattering medium. The resultant structure was heated at 50° C. for 20 minutes, heated to 90° C. and maintained at 90° C. for 5 minutes. A polymer-dispersed type TFT-LCD panel was thereby manufactured.

The polymer-dispersed type TFT-LCD panel was put to the test, in which a voltage of 20 V was applied between the opposing electrodes. The panel produced high-luminance colors. The panel was found to utilize 30% of external light to produce various colors.

EXAMPLE 41

A phase-change type TFT-LCD panel was made in the following method.

First, TFT switching elements were mounted on one transparent substrate, thereby to form pixels on this transparent substrate as illustrated in FIG. 35. Color filters shown in FIG. 28, each containing a light-scattering pigment and having a size of 40×40 μm, were formed by printing technique on the transparent substrate. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes. Cholesteric liquid crystal (d/p=3) containing dichroic cyan dye was filled in a fourth-pixel space, cholesteric liquid crystal (d/p=3) containing dichroic magenta dye was filled in a fifth-pixel space, and cholesteric liquid crystal (d/p=3) containing dichroic yellow dye was filled in a sixth-pixel space. Cholesteric liquid crystal containing no dyes was filled in the other pixel spaces. As a result, a phase-change type TFT-LCD panel was manufactured.

The phase-change type TFT-LCD panel, thus made, was tested. That is, a voltage of 40 V was applied between the transparent electrode and pixel electrodes. The panel produced high-luminance colors. The panel was found to utilize 30% of external light to produce various colors.

EXAMPLE 42

A phase-change type TFT-LCD panel was made in the following method.

First, TFT switching elements were mounted on one transparent substrate, thereby to form pixels on this transparent substrate as illustrated in FIG. 35. Color filters shown in FIG. 28, each containing a light-scattering pigment and having a size of 40×40 μm, were formed by printing technique on the transparent substrate. A protective film having a thickness of 1500 angstroms was formed on the color filters. Next, ITO was vapor-deposited on the protective film, forming an ITO layer having a thickness of 1000 angstroms. The ITO layer was patterned, thus forming pixel electrodes. The pixel electrodes were electrically connected to the source electrodes of the TFTs. Then, resist having black pigment dispersed in it was applied, forming walls which were 10 μm high and which were to surround pixels.

Next, ITO was vapor-deposited on the other transparent substrate, forming a transparent electrode having a thickness of 1000 angstroms. The two substrates and were positioned parallel to each other and spaced apart from each other—with the transparent electrode opposing the pixel electrodes. Smectic A liquid crystal containing dichroic cyan dye was filled in a fourth-pixel space, smectic A liquid crystal containing dichroic magenta dye was filled in a fifth-pixel space, and smectic A liquid crystal containing dichroic yellow dye was filled in a sixth-pixel space. Smectic liquid crystal containing no dyes was filled in the other pixel spaces. Heating electrodes were formed on both transparent substrates. As a result, a phase-change type TFT-LCD panel was manufactured.

The phase-change type TFT-LCD panel, thus made, was tested. That is, a voltage of 15 V was applied between the transparent electrode and pixel electrodes. The panel produced high-luminance colors. The panel was found to utilize 32% of external light to produce various colors.

As has been described, the display device according to the present invention comprises a first substrate having an electrode, a second substrate having color filter layers and pixel electrodes, and a light-scattering medium interposed between the first and second substrates. The display can therefore produce high-luminance colors, by using external light at high efficiency and with a low consumption of electric power.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A reflective direct-view type display device which comprises:

a first substrate having two major surfaces and electrode provided on a first major surface;

a second substrate having two major surfaces and color filter layers and pixel electrodes provided on a first major surface;

a light-scattering medium interposed between said first and second substrates positioned with said electrode opposes said pixel electrodes; and at least one color filter layer provided on the first major surface of said first substrate and opposing at least one of said color filter layers provided on said first major surface of said second substrate.

2. The display device according claim 1, wherein said first substrate differs in spectral property from said second substrate and exhibits a luminous reflectance of at most 25% while said light-scattering medium remains in non-scattering state.

3. The display device according to claim 1, which is designed to satisfy the following equation:

$$2 \leq \left\{ (100-Tr) \times \left(\frac{Tl}{100}\right)^2 + \left(\frac{Tr}{100}\right)^2 \times R2 \right\} / R2 \quad (I)$$

where T1 is the luminous transmittance (%) of said first substrate, R2 is the luminous reflectance (%) of said second substrate, as measured at the outer surface of said first substrate, and Tr is the transmittance which said light-scattering medium exhibits in a 2° view field while it is scattering light.

4. The display device according to claim 1, wherein designed to satisfy the following equation:

$$71 \leq M \leq 100 \quad (I)$$

where M is the product of the luminous transmittance T1' of said color filter layer on said first substrate and the area ratio D of this color filter layer to the non-pixel region of said first substrate.

5. The display device according to claim 1, wherein the color filter layer provided on the first substrate have colors complementary to those of the color filter layers provided on the first substrate.

6. The display device according to claim 5, wherein a relative luminosity of a color filter layer formed on said first substrate is higher than that of a color filter layer formed on said second substrate.

7. The display device according to claim 1, wherein said at least one color filter layer is a yellow filter layer.

8. The display device according to claim 7, wherein said color filter layers are a magenta filter layer, a cyan filter layer and a black filter layer, and said yellow filter layer opposes a part of said black filter layer.

9. The display device according to claim 7, wherein said color filter layers are a magenta filter layer, a red filter layer, a blue filter layer and a cyan filter layer, and said yellow filter layer opposes said cyan filter layer.

10. The display device according to claim 7, wherein said color filter layers are a red filter layer, a green filter layer and a blue filter layer, and said yellow filter layer opposes a part of said blue filter layer.

11. The display device according to claim 7, wherein said color filter layers are a magenta filter layer, a red filter layer, a blue filter layer and a cyan filter layer, and said yellow filter layer opposes said cyan filter layer and said blue filter layer.

12. The display device according to claim 7, wherein said color filter layers are a red filter layer, a green filter layer, a blue filter layer and a black filter layer, and said yellow filter layer opposes a part of said black filter layer.

13. The display device according to claim 7, wherein said yellow filter layer exhibits a transmittance of at least 80% to light having a wavelength of 545 nm.

14. The display device according to claim 7, further comprising a green filter layer provided on said first substrate.

15. The display device according to claim 14, wherein said color filter layers are a red filter layer, a blue filter layer and a magenta filter layer, said yellow filter layer oppose a part of said blue filter layer, and said green filter layer opposes said magenta filter layer.

16. The display device according to claim 14, wherein said color filter layers are a red filter layer, a blue filter layer and a magenta filter layer, and said green filter layer opposes said magenta filter layer.

17. The display device according to claim 1, wherein said color filter layers include a green filter layer, and said green filter layer exhibits maximum transmittance to light having a wavelength ranging 500 nm to 535 nm.

18. The display device according to claim 1, wherein said color filter layers include a green filter layer, and said green filter layer exhibits a transmittance of 10 to 50% to light having a wavelength of 545 nm.

19. A reflective direct-view type display device which comprises:

a first substrate having two major surfaces and electrode provided on a first major surface;

a second substrate having two major surfaces and color filter layers and pixel electrodes provided on a first major surface wherein said color filter layers comprise at least a black filter layer; and a light-scattering medium interposed between said first and second substrates positioned with said electrode that opposes said pixel electrodes, and a yellow dye is disposed in that part of said light-scattering medium which opposes any part of the black filter layer.

* * * * *